US012465963B2

(12) United States Patent
Cordaro

(10) Patent No.: US 12,465,963 B2
(45) Date of Patent: Nov. 11, 2025

(54) LANDFILL BIOGAS EXTRACTION PLANT WITH REMOTE MANAGEMENT AND CONTROL

(71) Applicant: EXE-ENGINEERING FOR ENVIRONMENT S.R.L., Poggibonsi (IT)

(72) Inventor: Gianni Cordaro, Poggibonsi (IT)

(73) Assignee: EXE—ENGINEERING FOR ENVIRONMENT S.R.L., Poggibonsi (IT)

( * ) Notice: Subject to any disclaimer, the term of this patent is extended or adjusted under 35 U.S.C. 154(b) by 0 days.

(21) Appl. No.: 18/289,555

(22) PCT Filed: May 12, 2022

(86) PCT No.: PCT/IB2022/054426
§ 371 (c)(1),
(2) Date: Nov. 3, 2023

(87) PCT Pub. No.: WO2022/238952
PCT Pub. Date: Nov. 17, 2022

(65) Prior Publication Data
US 2024/0253095 A1    Aug. 1, 2024

(30) Foreign Application Priority Data

May 12, 2021    (IT) .................. 102021000012242

(51) Int. Cl.
*E21B 43/12* (2006.01)
*B09B 1/00* (2006.01)
(52) U.S. Cl.
CPC .............. *B09B 1/006* (2013.01); *E21B 43/12* (2013.01)
(58) Field of Classification Search
CPC ................................ B09B 1/006; E21B 43/12
See application file for complete search history.

(56) References Cited

U.S. PATENT DOCUMENTS

| 4,026,355 A | * | 5/1977 | Johnson | .................. | E21B 43/30 |
| | | | | | 405/129.95 |
| 4,890,672 A | * | 1/1990 | Hall | .................. | B09B 1/00 |
| | | | | | 73/152.01 |

(Continued)

FOREIGN PATENT DOCUMENTS

EP        3285939 B1    3/2021

OTHER PUBLICATIONS

International Search Report and Written Opinion for PCT/IB2022/054426, dated Sep. 26, 2022.

*Primary Examiner* — Steven A Macdonald
(74) *Attorney, Agent, or Firm* — Troutman Pepper Locke LLP

(57) ABSTRACT

A remote control system of a plant for managing the biogas catchment wells of a landfill in an automated manner by means of central software, adapted to optimize biogas production by increasing its flow rate and maximizing the concentration of methane therein. The plant has a plurality of extraction wells, which are organized in substations, and an infrastructure of controllers for data acquisition and data sending. Each well is associated with an infrastructure of sensors, an adjustment valve, and an actuator. The sensors are adapted to measure the volume percentage of methane % CH4, the volume percentage of oxygen % O2, the flow rate Q sucked in, and the applied negative pressure P of the well. The extraction wells of a substation are connected to a controller of the infrastructure of data acquisition and data sending for sending the values measured from the sensors to the remote control system (100) through a communication network. The remote management system receives the values measured from the sensors through the controllers, processes them, and based on predetermined rules generates the actuation commands of the actuators acting on the adjustment valves. The predetermined rules are based on a (Continued)

preference principle, according to which the well to be opened more is chosen based on its contribution compared to the other wells, and on an interference principle, according to which, in the case of two interfering wells, the control system chooses the well from which to suck more biogas based on an average performance index (IQ) of the wells.

21 Claims, 14 Drawing Sheets

(56) References Cited

U.S. PATENT DOCUMENTS

| | | | | |
|---|---|---|---|---|
| 6,169,962 | B1 * | 1/2001 | Brookshire | G01F 1/42 |
| | | | | 702/50 |
| 6,999,883 | B1 | 2/2006 | Brady et al. | |
| 8,163,242 | B2 * | 4/2012 | Elkins | B09B 1/00 |
| | | | | 73/152.01 |
| 8,404,184 | B2 * | 3/2013 | Tooley | G01N 1/22 |
| | | | | 422/68.1 |
| 9,023,131 | B2 * | 5/2015 | Tremblay | B01D 19/0073 |
| | | | | 95/1 |
| 9,677,976 | B2 * | 6/2017 | Chrin, II | G01N 33/0073 |
| 10,029,291 | B2 * | 7/2018 | Fischer | E21B 33/03 |
| 10,150,081 | B2 * | 12/2018 | Nurkowski | B01D 53/864 |
| 10,190,392 | B1 * | 1/2019 | Bachus | B09B 1/006 |
| 10,946,420 | B2 * | 3/2021 | Quigley | B09B 1/006 |
| 11,673,171 | B2 * | 6/2023 | Hale | B09B 1/006 |
| | | | | 405/129.95 |
| 12,090,532 | B2 * | 9/2024 | Quigley | G01N 33/004 |
| 2002/0056550 | A1 * | 5/2002 | Catanla | E21B 43/164 |
| | | | | 405/129.95 |
| 2017/0216893 | A1 * | 8/2017 | Campanella | B09B 1/006 |
| 2017/0218730 | A1 * | 8/2017 | Campanella | E21B 43/00 |
| 2017/0218731 | A1 * | 8/2017 | Campanella | E21B 43/00 |
| 2017/0218732 | A1 * | 8/2017 | Campanella | E21B 43/12 |
| 2017/0254787 | A1 * | 9/2017 | Campanella | G01N 33/0036 |
| 2020/0086365 | A1 * | 3/2020 | Campanella | G01N 33/0063 |
| 2020/0101505 | A1 * | 4/2020 | Quigley | B09C 1/005 |
| 2021/0063304 | A1 * | 3/2021 | Chambers | F23G 7/08 |
| 2021/0229142 | A1 * | 7/2021 | Quigley | G01N 33/0068 |
| 2022/0008970 | A1 * | 1/2022 | Quigley | B09B 1/00 |
| 2022/0008971 | A1 * | 1/2022 | Quigley | G01N 33/0047 |
| 2022/0008972 | A1 * | 1/2022 | Quigley | E21B 49/0875 |
| 2022/0176422 | A1 * | 6/2022 | Quigley | B09B 1/006 |
| 2023/0115676 | A1 * | 4/2023 | Hostetter | E21B 47/10 |
| | | | | 166/250.01 |
| 2023/0302508 | A1 * | 9/2023 | Campanella | E21B 43/00 |
| 2023/0324353 | A1 * | 10/2023 | Campanella | E21B 47/06 |
| | | | | 166/264 |
| 2024/0201662 | A1 * | 6/2024 | Quigley | G05B 19/416 |
| 2024/0253095 | A1 * | 8/2024 | Cordaro | B09B 1/006 |

* cited by examiner

LANDFILL BIOGAS EXTRACTION PLANT WITH REMOTE MANAGEMENT AND CONTROL

This application is a national stage application under 35 U.S.C. § 371 of PCT Application No. PCT/IB2022/054426, filed May 12, 2022, which claims the priority benefit of Italy Patent Application No. 10201000012242, filed May 12, 2021.

FIELD OF THE INVENTION

The present invention relates to techniques for managing and controlling a landfill biogas collection plant.

In particular, techniques and operating logics are considered to automate the monitoring and adjustment of biogas extraction from a landfill to increase the amount of biogas collected and maximize methane concentration.

KNOWN PRIOR ART

The disposal of waste in landfills is a widespread practice in virtually every country in the world. In the field, it is common practice to extract the biogas generated by the natural fermentation of the organic solid waste heaps contained in the landfill body through boreholes, referred to as catchment wells.

Generally, gases, including methane, are produced by the decay of the organic matter contained in the waste under anaerobic conditions, which gases migrate from inside the landfill through the covering layer and end up being released into the atmosphere.

Currently, it is estimated that about 50% of the gas produced in landfills is collected through conventional biogas collection plants and that the rest is lost to the atmosphere.

A landfill generally comprises a large number of wells, in the order of fifteen wells per hectare of landfill surface area, through which it is attempted to intercept and suck in some of this produced gas, conveying it to the biogas collection plant.

The biogas collection plant consists of a plurality of biogas collection stations, referred to as substations, to which a high number of wells, usually from ten to twenty per station, are connected through pipes, which collect the biogas produced in the various wells. Each substation is, in turn, connected to a delivery line, which collects the gas from the various substations and directs it to a suction pump, referred to as a blower SOF, and then goes to the motors M for energy recovery.

Therefore, each well is connected to the collection system through a pipe in which the biogas produced and extracted from its area of influence within the landfill circulates. To adjust the suction acting at the head of each well, on-off valves are inserted along each pipe to adjust the negative pressure applied within the landfill.

An excessively low negative pressure would not allow sufficient biogas to be extracted, while an excessively high negative pressure would facilitate the inlet of air from outside, resulting in the risk of explosion due to the mixture of methane and oxygen that would be generated.

Currently, the biogas extraction from the landfill is monitored and controlled manually by an operator, who, after having measured the negative pressure and biogas composition values of each extraction well, adjusts the opening of each valve, trying to calibrate the negative pressure applied to the well.

The adjustment is performed by logics related to the operator's experience and considering only some of the biogas parameters. Furthermore, the measurement and adjustment of each well, precisely because it is done manually, occur at very distant time intervals, which may be as often as once or twice a month.

Therefore, it is apparent that such a system cannot take into account the hourly and daily variations in the parameters inside and outside the landfill.

Furthermore, even with the best prior known technology, each well is always analyzed individually, not considering its interaction with the adjacent wells, and without assessing its relative contribution to the whole collection system. Indeed, to date, the adjustment logic does not take into account the performance of each well, nor the possibility of extracting some of the gas from neighboring wells (the waste pile is indeed permeable, whereby the ranges of influence of the suction of the various wells partially overlap).

SUMMARY OF THE INVENTION

The present invention relates to a new landfill management system designed to automate the monitoring and adjustment of biogas extraction from the landfill, through a management and control system which allows analyzing all the wells in the landfill and then adjusting each well also related to the behavior of the other wells, so as to increase the amount of gas collected while maximizing the concentration of methane therein.

The catchment plant provides for the division of biogas collection into "substations," each consisting of a manifold into which from ten to twenty pipes lead, each of which is connected to the head of a specific catchment well. Each substation is then connected to a larger pipe, referred to as a "line", which collects the biogas from the various substations and, passing through a blower, sends it to the energy recovery plant.

To monitor and adjust biogas extraction, the plant provides for an infrastructure of sensors (input) and actuators (output) applied at the substation level on each of the pipes from the extraction wells.

All the collection points are connected to a field infrastructure connected to a data acquisition and data sending system, such as a PLC, for exchanging data with the central control system, physically located in a remote environment. Therefore, all field data are collected and sent to the central system, which through an algorithm analyzes the parameters of each well, compares them with the others, and through preference and interference logics, commands adjustment to the valve of each well.

The management and control system is a system capable of analyzing the parameters of each well in terms of the volume percentage of methane, carbon dioxide, and oxygen (through a gas analyzer), the flow rate sucked from each well, and the negative pressure applied in each well (by virtue of additional probes). Furthermore, as the algorithm is applied to each collection point (well) and globally manages all the wells in the landfill, the management of alarms and emergency stops is also common and shared.

By virtue of the specific choice and position of the sensors to be used and the specific algorithms and control logics, the system at hand allows acting on each individual well, evaluating its specific contribution in terms of total methane flow rate in the biogas sucked from the landfill relative to two principles: a principle of preference, according to which the well to be open more is chosen based on its contribution compared to the other wells, and a principle of interference, according to which, in the case of two interfering wells, is chosen one well from which to suck more biogas (the waste pile is indeed permeable, whereby the ranges of influence of the catchment of the various wells partially overlap).

In particular, the control system calculates two parameters for each well. The first parameter, referred to as a "factor K," is a well performance indicator, and is determined as the ratio between the variation in methane concentration and the variation in gas flow rate. The second parameter, referred to as a "factor $S_t$", is an indicator of well stability or volubility, and is determined as the ratio between the variation in oxygen concentration and the variation in gas flow rate. The factor K and the factor $S_t$ combine to compile an overall well "performance" index.

Based on these values, the adjustment of each actuator located at the head of each extraction well is controlled, which, by adjusting the negative pressure, allows the passage of a gas flow rate having a given methane percentage.

All measurement sensors are installed at the substation level and communicate with a data acquisition and data sending system (PLC type) that controls the actuators. In turn, the data acquisition and data sending systems (PLC) of each substation communicate with the central server, sending the data thereto and receiving the adjustment directions for the individual well actuators.

Therefore, it is the object of the solution suggested here to create a plant capable of managing all the wells in the landfill in an automated and remote manner, managing the collection more efficiently, so as to increase the amount of biogas collected, and decrease that emitted into the atmosphere.

BRIEF DESCRIPTION OF THE FIGURES

Further features and advantages of the invention will become apparent from the following description provided by way of a non-limiting example, with the aid of the figures shown in the accompanying drawings, in which.

Figure 1B:
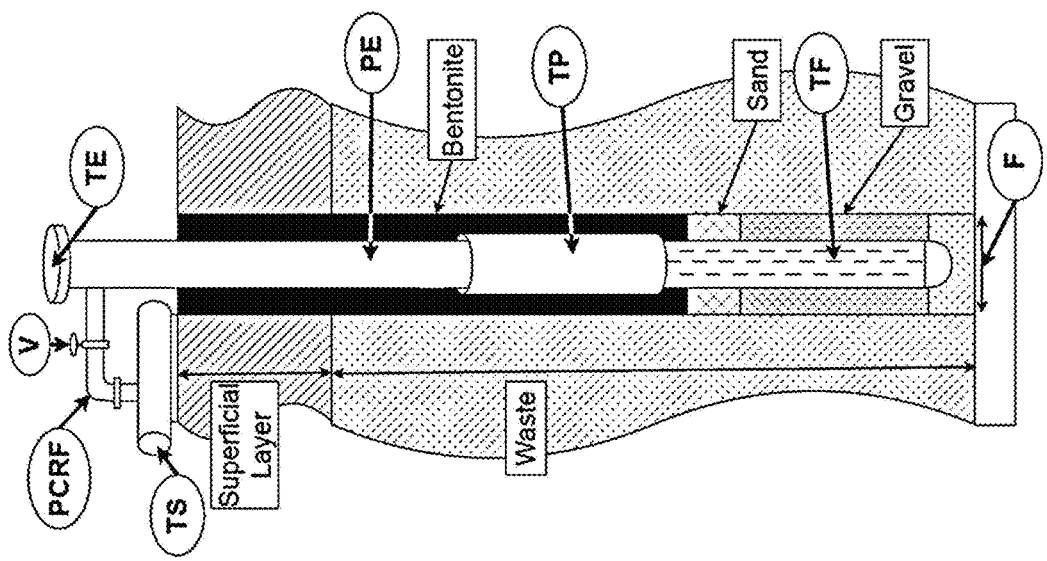
FIGS. 1a and 1b show examples of extraction wells installed in a landfill.

The parts, according to the present description, are shown in the drawings, where suitable, employing conventional symbols, showing only the specific details which are pertinent to the understanding of the embodiments of the present invention, so as not to highlight details which will be immediately apparent to those skilled in the art, with reference to the description provided below.

DETAILED DESCRIPTION OF THE INVENTION

It is the object of the present invention to provide an automated plant, which, by monitoring and adjusting the extraction of biogas from a landfill, allows increasing the amount of biogas extracted by maximizing the concentration of methane therein.

Such an object is achieved by a management and control algorithm (or logics), which allows the monitoring and adjustment of the opening/closing of the adjustment valves of the various wells which form the plant so that all wells can be managed globally, and the extraction of methane gas produced by the landfill can be made more effective and efficient.

Currently, with the manual monitoring carried out by technicians directly on site, the interventions to check the conditions and modify the valve opening/closing settings are performed on a weekly or monthly basis.

Conversely, with the solution suggested here, the system settings can be checked and modified at much shorter intervals, e.g., every half hour. It follows that optimization can be more efficient and effective by having the possibility of closer monitoring which allows faster reaction times to any changes in conditions inside and outside the landfill.

Furthermore, the solution suggested here allows obtaining an adaptive system, which reacts quickly and better optimizes methane extraction from each catchment well.

The solution described here provides for the possibility of monitoring and controlling the productivity of the wells of a landfill by making substations, each having a given number of wells (from ten to twenty), and measuring the flow rate, pressure, methane concentration, carbon dioxide and oxygen parameters for each well, to determine given performance factors, and their average values, to be used as an internal reference for the plant, and based on which to set the algorithm for adjusting the negative pressure of each well in the landfill.

The biogas temperature and humidity, external barometric pressure, and rainfall height are also measured in addition to the main parameters.

A normal landfill D consists of about three hundred extraction wells PE. The extraction wells PE are holes of about 30 cm into the waste pile, into each of which a slitted high-density polyethylene (PE-HD) pipe is inserted, through which the biogas produced by the landfill D is sucked (FIG. 1).

Figure 1A:
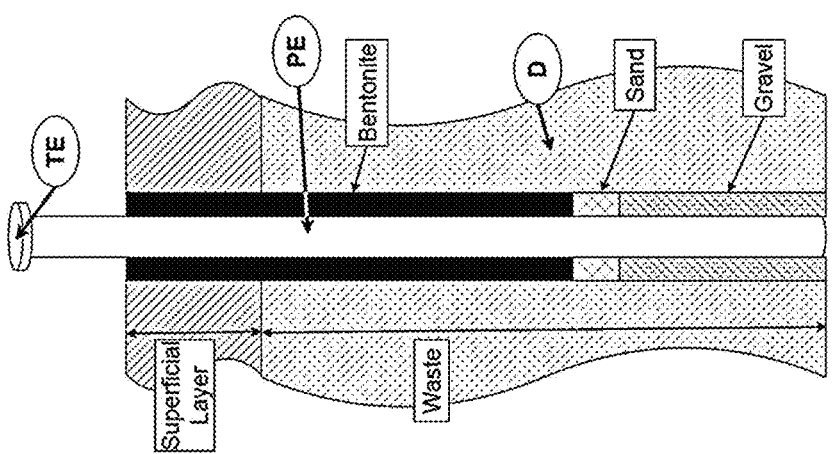

Referring to FIG. 1b, a well PE has a slitted pipe TF, which is placed in contact with hole F made in the landfill. The slitted pipe TF is connected to a pipe TP which makes the well PE. At the surface, the pipe TP ends with an element referred to as the extraction well head TE. The extraction well head TE is connected to a valve V, which is, in turn, connected to a sampling port with a flexible connector PCRF. The sampling port with flexible connector PCRF is then connected to a surface delivery pipe TS.

Figure 2:
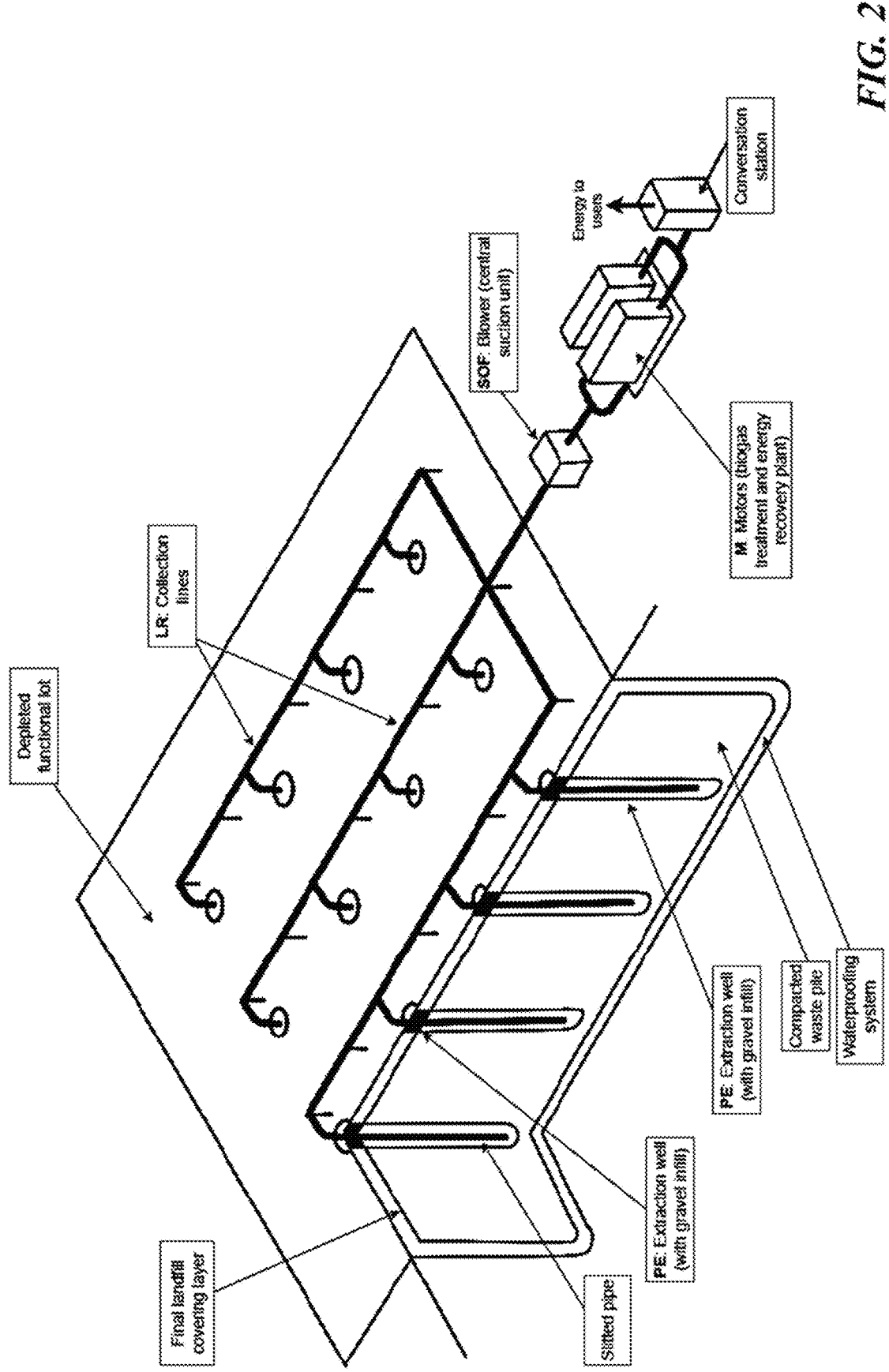
FIG. 2 shows an example of a biogas collection plant, which has a plurality of extraction wells connected directly to the collection line.
Figure 3:
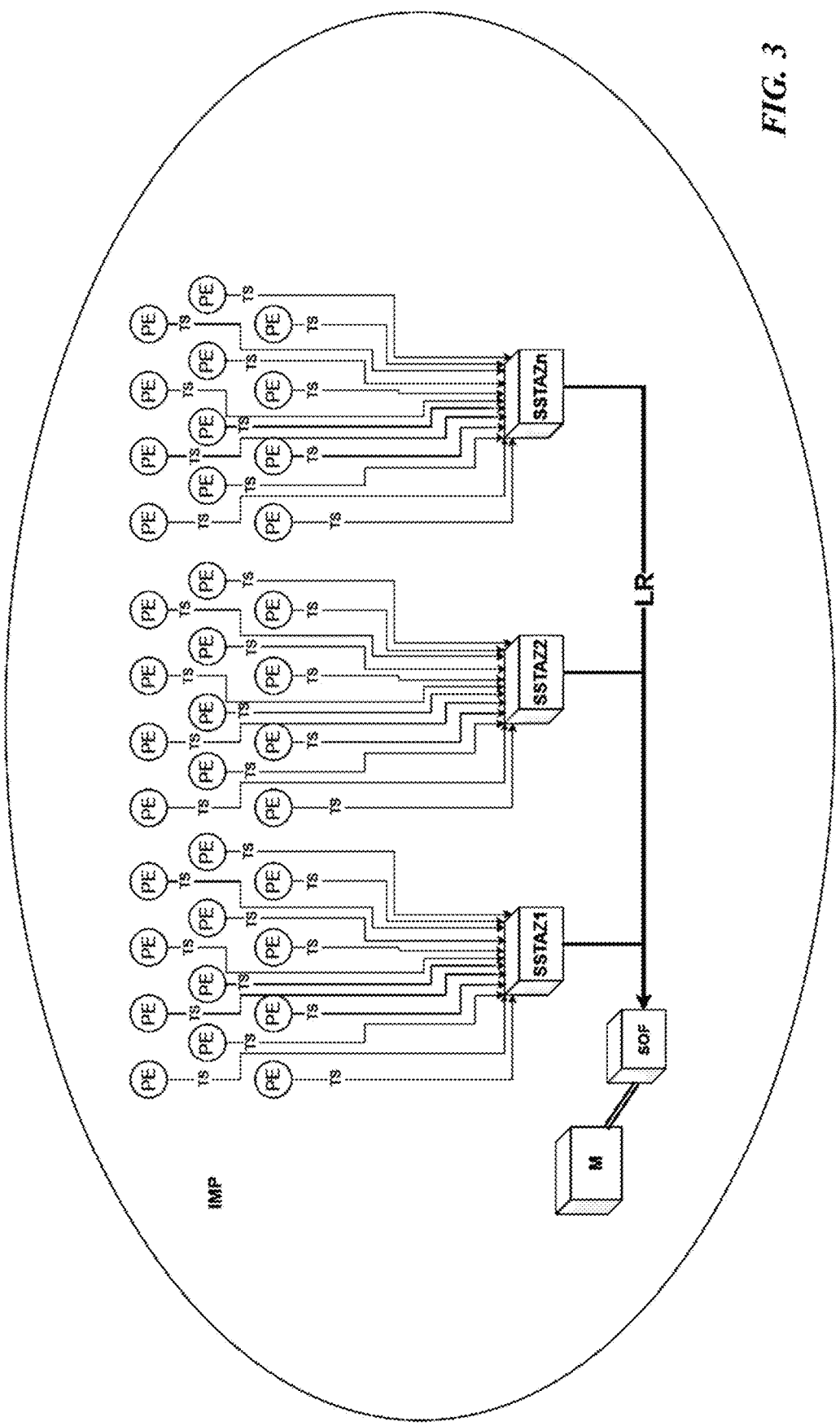
FIG. 3 shows an example of a biogas collection plant, which has a plurality of extraction wells organized by substations and connected through the latter to the collection line.

The gas extracted from each well PE is collected and conveyed to a surface pipe TS, which can either connect directly to a larger delivery pipe, referred to as the collection line LR, as shown in FIG. 2, or connect together with the other pipes to the manifolds, referred to as substations SSTAZ, as shown in FIG. 3, and from these go into the collection line LR, which connects the various substations SSTAZ.

The solution suggested here will now be described by referring to FIGS. 4 to 10.

A biogas collection plant IMP consists of a plurality of collection substations SSTAZi into which biogas generated by the natural fermentation of organic solid waste heaps and extracted through various well PEs is conveyed. A surface pipe TS runs from the head TE of each well PE to a manifold C, to which it connects through a dedicated horizontal flanged connection CF. Approximately ten surface pipes TS1, TS2, TS3, ..., TS10 each connected to a well PE1, PE2, PE3, ..., PE10 located on the surface of the landfill D come to each manifold C. The whole of the manifold C and the flanged connections to the various surface pipes CF-TSi forms a substation SSTAZi.

There can be up to twenty surface pipes TS, which start from well PEs and connect to the substation SSTAZ.

Figure 4B:
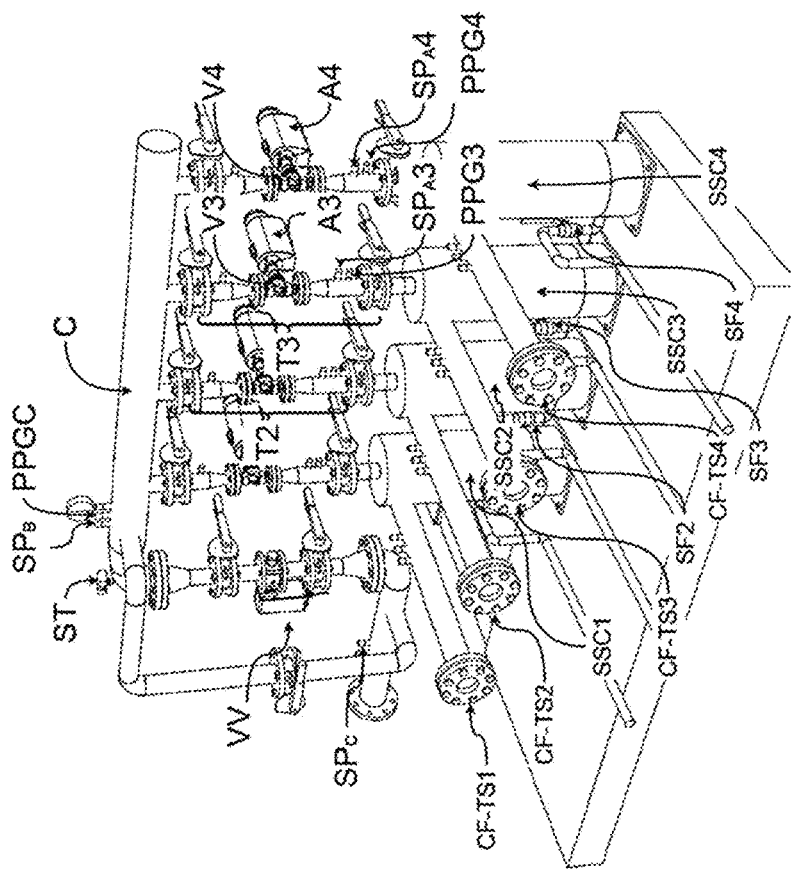
FIGS. 4a and 4b show details of a substation with several wells and the connections of the wells to the collection line through the manifold.
Figure 4A:
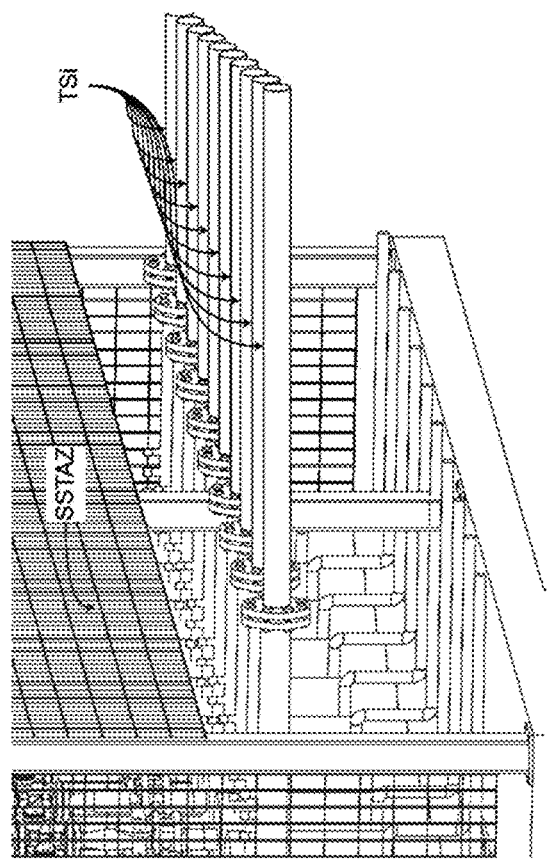

With particular reference to FIGS. 4a and 4b, at the connection point of the high-density polyethylene (HDPE) surface pipe TS to the substation SSTAZ there is also a first condensate drainage system SSC, in which the condensate that the biogas forms on the way from the well head TE to the connection system CF-TS with the substation SSTAZ is collected and drained. It consists of a cylinder of nominal diameter DN 250 and 70 cm in height completely made of stainless steel, inside which the biogas can expand and cool faster due to the larger exchange surface area with the external environment. It is worth noting that when the biogas leaves the landfill D can also exceed a temperature of 60° C., whereby the large metal surface allows for rapid heat exchange, facilitating the condensation of water vapor contained within the mixture. All the water vapor formed along the stretch of the surface pipe TS and in the condensate drain system cylinder SSC is collected inside the cylinder and drained through a siphon SF located at the base of the cylinder. The siphon SF consists of a nominal DN 20-diameter pipe, which starts from the base of the cylinder and rises vertically upward for 15 cm, after which it has a short horizontal section of semi-transparent material in which a ball valve is placed, and finally has a descending stretch, which connects it to a horizontal plastic pipe to divert the condensate formed by the substation SSTAZ.

The function of this type of siphon SF is to create a hydraulic head inside the cylinder so as to avoid that the negative pressure to which the whole substation SSTAZ is subjected does not allow outside air to enter right from the condensate drain pipe. Furthermore, precisely because such a hydraulic head is inside the cylinder, the volume of condensate available to maintain the level of the head is sufficient to prevent it from drying up, which could happen if the hydraulic head were created inside the siphon. In any event, however, a ball valve is inserted into the small semi-transparent horizontal stretch of the siphon, so that the presence of such a head can be visually checked and the drain could be closed, if necessary, to form a sufficient volume of condensate to recreate the hydraulic head.

Following the cylinder of the condensate drain system SSC, a vertical stub pipe T starts, which allows conveying the biogas from the extraction well PE into the manifold C to which it is attached from underneath. All the field instrumentation for analyzing and adjusting the connected extraction well PE is connected to such a vertical stub pipe T.

Figure 5:
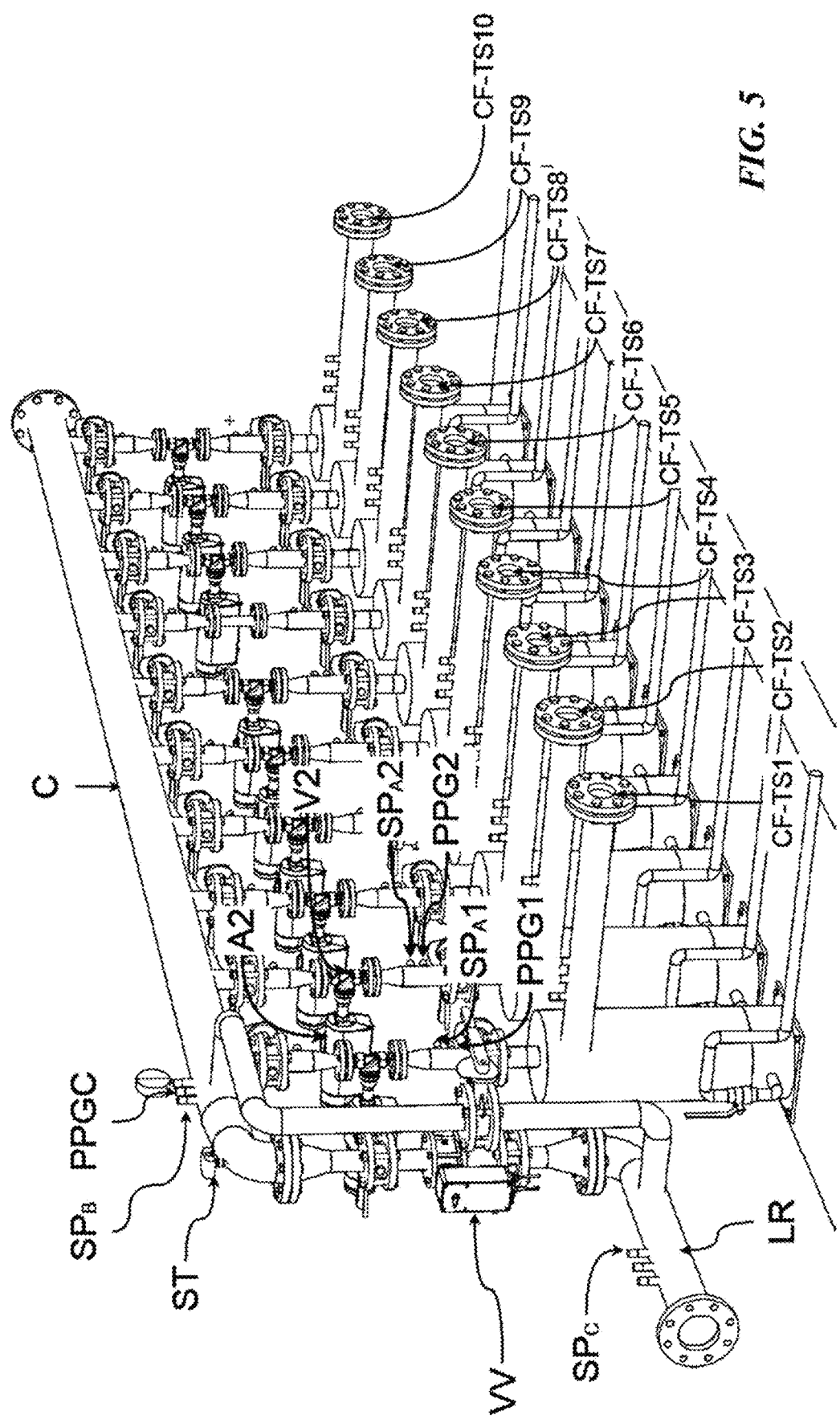
FIG. 5 shows an example of a substation construction with connections to ten extraction wells, which flow into the monitored manifold.

An example of a management and control system is shown in FIG. 4b and FIG. 5, in which a plurality of sensors S are applied on the stub pipe T. In the embodiment shown in FIG. 4b and FIG. 5, for each stub pipe T, starting from the connection with the surface pipe TS and going to the manifold C (direction of the biogas flow) there is, in order, a first pressure meter $SP_A$, a gas sampling point PPG, an automatic adjustment valve V, with the respective actuator A and a possible flow meter SQ.

This flow meter SQ can also be omitted, if it is decided to calculate the flow rate indirectly through the pressure difference upstream and downstream of the valve V, and knowing the flow coefficient Kv of valve V itself.

The system for calculating the flow rate in this manner will be explained later. Again inside the vertical stub pipe T, there are two manual butterfly valves for possible maintenance work. Again proceeding in the direction of flow, the biogas from the various well PEs is conveyed to the manifold C through the stub pipes T described above. A second pressure gauge $SP_B$, a gas sampling point in the manifold PPGC, and a biogas temperature probe ST are located on the manifold C.

The central remote control system 100 controls the adjustment of each actuator A based on these values.

Each substation SSTAZi is then connected through a second valve VV to a larger pipe, referred to as the collection line LR (see FIG. 2), which collects the biogas from all substations SSTAZi served by this collection line LR and, passing through a blower SOF, sends it to the motors M. Also in the collection line LR, just after the valve VV acting on the manifold C, there is a third pressure gage $SP_C$ for the negative pressure acting on the collection line LR for each substation SSTAZ. All the gas sampling points PPG1, PPG2, PPG3, ..., PPGC are connected through small tubes made of Rilsan® polyamide 11 to gas composition analysis sensors SG, placed an electrical controller CE, which will be described later, while all pressure probes of the wells $SP_A1$, $SP_A2$, $SP_A3$, $SP_A10$, of the manifold $SP_B$ and collection line $SP_C$ can be positioned directly at the measuring point or arranged in a separate panel and connected to the measuring point through tubes made of Rilsan®.

The valve VV acting on the manifold C is also adjusted by the management and control system 100, so that the automatic valves Vi of the individual wells PEi work in an optimal range of adjustment, about 30%-80% of the opening. If the valves Vi of the wells PEi are found to be too open (Ov>80%), the management and control system 100 tends to open the valve VV so as to have more negative pressure on the individual wells PEi, resulting in the partial closing of the individual valves Vi. Conversely, if the valves Vi of the wells PEi are found to be too closed (Ov<30%), the management and control system 100 tends to close the valve VV so as to decrease the negative pressure on the individual wells PEi by encouraging the partial opening of individual valves Vi. It is also possible to switch to a manual configuration of the management and control system which allows the operator to remotely set the opening % of the valve VV.

In the present case, a substation SSTAZ5 with nine wells PE1, PE2, PE3, ..., PE9 will be described by referring to FIG. 9.

The solution described can analyze the parameters of each well PEi in terms of volume percentage % $CH_4$ of methane, indicated by reference numeral 10, and volume percentage % $O_2$ of oxygen, indicated by reference numeral reference 20 (through a commercially available gas analyzer 104), flow rate Q sucked, indicated by reference numeral 30, from each well PEi, and applied negative pressure P, indicated by reference numeral 40 in each well PE (by virtue of additional commercially available sensors S, SQ, SP).

The central remote management and control system 100 based on these values controls the adjustment of each actuator Ax positioned on each valve Vx. The adjustment of each valve Vx, understood as the percentage of valve opening and indicated by reference numeral 50, being placed on each pipe coming from the head TEx of each extraction well PEx, allows the negative pressure P to be adjusted, thus allowing the passage of a flow rate Q with a given percentage % $CH_4$ of methane 10 and percentage % $O_2$ of oxygen 20.

All measurement sensors S, SP, SG, SQ are installed at the substation SSTAZ level and communicate with a data acquisition and data sending system, e.g., such as a PLC, which in turn communicates with the central server 102 placed in the remote management and control system 100, sending input data IN(10, 20, 30, 40) to the remote management and control system 100 at regular, predetermined intervals and receiving OUT (50) output commands from the remote management and control system 100 as indications for adjusting the actuators Ai of the individual wells PEi.

In particular, for a well PEi, the input signals INi (10*i*, 20*i*,30*i*, 40*i*) will be sent and output commands OUTi (50*i*) will be received. The system inputs, which are used for the plant control logics, are the percentage of methane (% $CH_4$), the percentage of oxygen (% $O_2$), the flow rate Q measured in $Nm^3/h$, and the negative pressure $P_A$ measured in mbar, i.e., the negative pressure acting on the well PE downstream of a valve V. The temperature and humidity of the biogas inside the manifold C are measured In addition to these specific parameters. The output of the control system is represented by the opening percentage of the individual valve Ov of each catchment well.

In turn, the remote management and control system 100 will send the data to graphical pages of a supervisory system, while still leaving the possibility for the operator to manage remotely some of the system parameters, e.g., such as the adjustment of the valve VV of the substation SSTAZ.

The adjustment logics allow making decisions about the individual well PEi, but also evaluating its contribution in terms of the total flow rate QTOT of biogas sucked from the landfill D with respect to two principles.

A preference principle in which the well PEx to be opened more is chosen based on its contribution compared to the other PEy wells, and an interference principle in which, in the case of two interfering wells, PEn and PEm, is chosen one well from which to suck more biogas (the waste pile is permeable whereby the ranges of influence of the catchment of the various wells partially overlap). Such logics will be written in software that will act at the level of the central unit, i.e., remote control system 100 (on Cloud or Server 102), and described later in the description.

It is also possible to install the software on each individual data acquisition and data sending system PLC in the case of a substation SSTAZ working isolated in a stand-alone configuration or to bring in some adjustment and control logics to make the information traffic lighter between the data acquisition and data sending system PLC of the substation SSTAZ and the central management and control system 100.

In the latter configuration, only some data analysis and adjustment algorithms of the individual substation actuators are already applied locally on the PLC or on gateways provided with microprocessors installed at the substation SSTAZi, from which data are sent to the central system 100. However, the central system 100 will analyze data from all wells PEi and send back to the processors of the individual substation SSTAZi the correction coefficients to be applied to the adjustment algorithm of each valve VVi in the substation SSTAZi.

Finally, a further configuration can be provided in which data from valves, pressure probes, and gas analyzer are collected in one or more gateways and sent through a cable to the specific plant/PLC server where the central software is installed. The solution suggested here thus provides for the analysis and optimization of the gaseous emission flow of the landfill D, with particular attention to the management of each individual well PEi considering that any variation implemented on the individual well PEx also involves a variation on the neighboring wells (PEx−1, PEx−2, . . . , PEx+1, PEx+2), because the wells PEi are all mutually communicating because the landfill D is a permeable and open system, in which there are no subdivisions or separations.

This occurs because the range of influence of each well PEx overlaps with the neighboring one, e.g., PEx+1, whereby, as the waste pile is a permeable medium, part of the biogas production of a well Pex can be sucked from the neighboring well PEx+1. The algorithm takes into account the behavior of the well PEx as the opening of the valve VVx varies, whereby if reaching a certain negative pressure the quality of the biogas starts to decrease rapidly, the system registers the instability of the well PEx, and the critical negative pressure beyond which not to go, and from that moment starts to close that well PEx, taking it back to acceptable values. At the same time, it starts to open the valves VVy of the neighboring wells (PEx−1, PEx−2, . . . , PEx+1, PEx+2), trying to suck part of said flow rate, so as to avoid it being emitted into the atmosphere and always controlling the methane and oxygen concentration values of the biogas from the neighboring wells (PEx−1, PEx−2, . . . , PEx+1, PEx+2).

The solution suggested here provides for the installation of a sensor infrastructure and the installation of an actuator infrastructure on existing landfills.

In particular, sensors Si and actuators Ai are installed for each of the extraction wells PEi in the landfill D, where the sensors Si measure the input data and the actuators Ai provide the outputs of the system.

It is known that the wells Pes, which form the plant IMP are used to collect and convey the produced gas mixture to an energy recovery system. Among the gases produced, the methane $CH_4$ is of particular importance, and plant optimization involves maximizing the amount of extracted methane gas.

The control system 100 of the plant described here thus aims precisely to increase the amount of biogas extracted from landfill D by maximizing the concentration of methane $CH_4$ in the gas mixture.

Thus, the control system 100 is based on an algorithm, which receives as input data measured from the sensors Si placed on each well PEi, processes them and generates as output OUTi commands to control and drive actuators Ai. In particular, the data (% $CH_4$, % $O_2$, Q, P) measured from the sensors Si are sent to the remote control center 100, which processes them and outputs commands OUTi to open/close adjustment valves Vi. Such commands OUTi are sent to the actuators Ai so that they can control the opening/closing of the valves Vi.

The remote processing aims to maximize methane collection from the whole plant. In particular, the objective is to increase the flow rate by maximizing the concentration of methane in the extracted gas stream. Therefore, the adjustment strategies for opening and/or closing the adjustment valves Vi of individual wells PEi are based on the values measured from the sensors Si and on information that also takes into account predictions of emission profile changes that will be encountered in neighboring wells PEi+1,i−1 by opening or closing one or more wells PEs.

To take such predictions into account, several factors are calculated to set a strategy for opening and closing the adjustment valves Vi, which aims to obtain the maximum percentage of methane obtainable from the plant.

As for the concentration measurements of methane % $CH_4$ and oxygen % $O_2$, the corresponding gas sensors SG can be placed either directly on the pipe coming from the well PE, or in an electric gas analysis controller CE, connected to the various well pipes PE of the gas collection points PPG through tubes made of Rilsan®.

The gas analysis controller CE will be described later. All the biogas collection points PPG are connected to a field infrastructure for data exchange with the central control system 100 to monitor the whole plant IMP and to account for the mutual influences of each well PE on neighboring wells.

The algorithm of the control system 100 is applied to each collection point PPGi. The control system 100 manages and accounts for interactions, which also occur between neighboring wells PEi+1,i−1.

In the suggested solution, the alarm management and emergency stop management are in common and shared.

In various embodiments, it is expected that the control system 100 will be physically located in a remote environment from the plant IMP.

All collection points PPG located on landfill D are connected to a field infrastructure (substation panel 106) for data exchange with remote control system 100. The field infrastructure is connected to a data acquisition and data sending system PLC.

The general architecture of the solution suggested here will now be described in the following description.

The infrastructure of control system 100 of a single substation will be described for the sake of simplicity. The management of each substation follows the scheme described above.

Each substation groups ten collection points PPG (one for each well PE).

Figure 6:
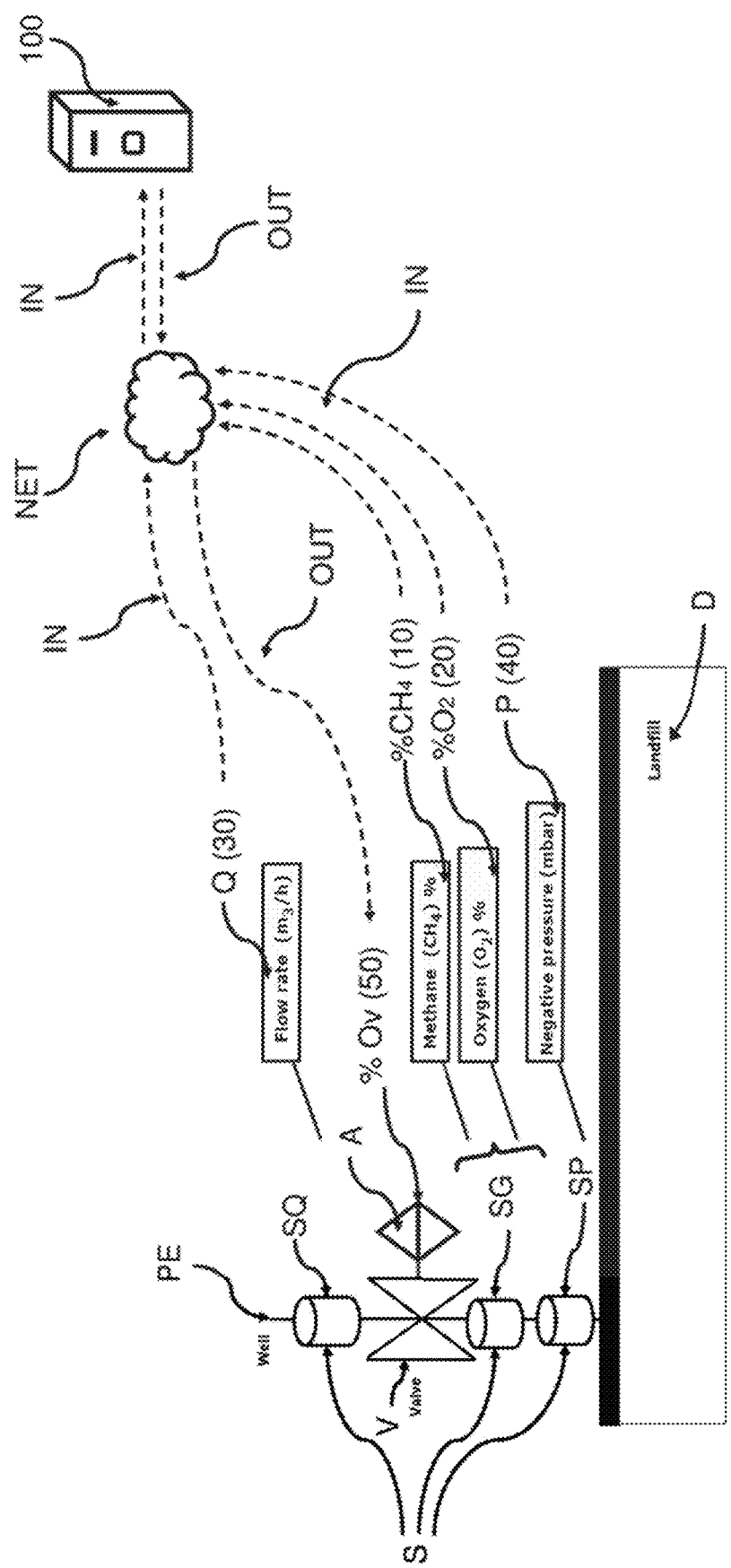
FIG. 6 shows an example of parameter measurement of a well by the installed sensors, with data input sent to the remote control system and output of the valve control command to the actuator located on the pipe coming from the well.

Referring to FIG. 6, a well PE is connected through an adjustment valve V to the landfill D. Several sensors S or probes are installed on the well PE to measure the methane concentration (% $CH_4$), indicated by reference numeral 10, the oxygen concentration (% $O_2$), indicated by reference numeral 20, the flow rate Q ($m^3$/h), indicated by reference numeral 30, and the negative pressure P (mbar), indicated by reference numeral 40.

Therefore, as shown by FIG. 6, the control system 100 receives as input IN, through the network NET, the values measured from the sensors S, SP, SG, and SQ, and in particular, the concentration 10 of methane $CH_4$, the concentration 20 of oxygen $O_2$, the flow rate 30 and the negative pressure 40.

The control system 100 processes the data received as input and outputs commands OUT for the actuators A, which control the opening percentage of the adjustment valves V.

Therefore, the output of control system 100 are the values 50 of opening percentage Ov of the valve V.

The set points of the control system 100 will now be defined.

The objective of the control system 100 is to maximize the collection of methane $CH_4$, i.e., to increase the flow rate of biogas extracted from the well PEs of the plant IMP by maximizing the concentration 10 of methane $CH_4$ within it. Therefore, the quality indicator IQ of the well PE is the product of the percentage 10 of methane $CH_4$ and the flow rate Q of the well PE shown in the drawings by reference numeral 30.

$$IQ = \% \, CH_4 \times Q$$

The sampling of the inputs IN involves cyclic readings every ten seconds with the sensors SQ of the input value of the negative pressure P, indicated on the drawings by reference numeral 40, and the flow rate Q indicated on the drawings by reference numeral 30. Therefore, at regular intervals, the control system 100 receives flow rate 30 and negative pressure 40 as input from the sensors SQ.

In some embodiments in the control system 100, each measured value from the sensors SQ is analyzed and validated and the last ten readings of each sensor SQ are stored. Therefore, for each well PE, you have stored the last ten values of the measured variables from the sensors SQ.

For each new measured value, the control system 100 checks the validity of such a new measurement NM, and in particular, the new measurement NM is considered valid if the value is within a range which provides a maximum deviation of 10% from the average value for said quantity, i.e., if the new measurement NM deviates from the average value by more or less than 10%. In particular, the measure is considered valid if it meets the condition: Average value−10%<new NM current measurement<average value+10%.

In the case of two consecutive readings with invalid new measurement values NM, the control system 100 generates a sensor SQ or probe failure alarm.

Otherwise, the methane $CH_4$ and oxygen $O_2$ values, i.e., the values of concentrations 10 and 20, will be read by the sensors SG at intervals of thirty minutes, so as to give the landfill D time to adjust to the new negative pressure conditions, set by the adjustment of the valves Vi of the plant IMP previously controlled by the outputs OUTi from the management and control system 100. Given the slowness of the system to react to pressure changes, only one measurement will be made within the thirty-minute time interval and such a value will be considered valid, thus also applying a type of management, which does not overuse the gas sensors SG, to avoid reducing their service life.

The control system 100 is set to consider an oxygen concentration above 2% as dangerous. Therefore, if the % $O_2$ value of oxygen $O_2$ concentration 20 reaches the value equal to 2% the control system 100 outputs commands to request the gradual closing of the well PEi referred to in the measurement.

The closing of the adjustment valve Vi of a well PEi occurs with the incidence of 1.5 mbar every thirty minutes. The closing continues in this mode until four consecutive readings are taken with oxygen $O_2$ concentration 20 below 2%. From then on, the collection point, i.e., the well PEi from which the measurements originate, is re-entered into the automatic management of the control system 100 and becomes part of the extraction system IMP again.

The macrofunction algorithm of the control system 100 of the extraction plant IMP is now described. The software architecture to be used will be dependent on the server system chosen at the design stage, and the manner in the field devices are accessed for reading and writing.

The control system 100 is applied to an active landfill D which is already producing and emitting gas.

Therefore, the following preconditions for the start of work are considered, i.e., a PAS suction pump, which is already active but does not work at maximum speed, and the adjustment valves V of the wells PE in partially closed condition (although not homogeneous).

The initial step aims to increase the amount of gas collected from each well PE which is part of the plant IMP.

Such a step must proceed by increasing the suction of the suction pump PAS until the maximum speed is reached.

The wells PEs with a percentage 10 of methane % $CH_4 > 45\%$ are considered to achieve this result.

The adjustment valves V are opened in steps of 1 mbar at a time (adjusting until a 1 mbar increase in negative pressure is achieved) every fifteen minutes until the 45% value of percentage 10 of extracted methane $CH_4$ is reached. It is assumed that, as a result of the increase in negative pressure P, the percentage 20 of oxygen $O_2$ increases, and the percentage 10 of methane $CH_4$ decreases.

The upper safety limit of $O_2$ at 2% is checked at this step and throughout the operation of the control system 100.

The read/write cycle of values occurs every fifteen minutes.

Each well PEi is brought into stable conditions for one of the following conditions:
percentage 10$i$ of methane $CH_4$ (% $CH_4$)=45%
100% percentage opening Ovi of the adjustment valve Vi
percentage 20$i$ of oxygen $O_2$=2%

The optimization step is activated, i.e., the monitoring of the plant IMP by the control system 100 begins when the maximum speed of the suction pump PAS has been reached, complying with the previous conditions.

The purpose of the Optimization Cycle is to increase the concentration 10 of methane $CH_4$, at the same intake flow rate.

Flow optimization is based on the assumption that, for the same flow rate (the suction pump PAS is at maximum speed anyway), it is preferable to open wells PEx with the better efficiency and close wells PEy with the worse efficiency.

The input values are read in the manner described above.

The implementation cycle is applied every fifteen minutes.

The values of the sensors S for each well PEi are stored, i.e., the first reading of the values is taken, at time T0.

In particular, the values of methane percentage 10$i$ $CH_4$ and flow rate 30$i$ at instant T0 ($CH_4T0-QT0$) are stored for each well PEi.

Every ten seconds, the adjustment valve Vi is opened by 1% (or lower value according to the resolution of the actuator Ai associated with the adjustment valve Vi) until the difference $\Delta P$ between the pressure PT0 at time T0 and the current measured pressure Patt is equal to 1 mbar, i.e., $\Delta P=PT0-Patt=1$ mbar. Of course, such an operation is feasible if and only if the Vi adjustment valve is not fully open.

A second reading T1 is taken after fifteen to thirty minutes.

Also in this case, the percentage value 10$i$ of methane $CH_4$, the percentage value 20$i$ of oxygen $O_2$ and flow rate Q at instant T1 ($CH_4T1-O_2T1-QT1$) are stored.

The factor K, i.e., the well performance indicator, is calculated once these values are measured.

Finally, the factor $S_t$, i.e., the stability or volatility indicator of the well PE, is calculated.

The factor Kj indicates the residual productivity capacity of the well PEj. A factor Kj greater than the average methane concentration in all the biogas sucked in indicates that the well PEj still has residual productivity.

The factor K takes into account changes in methane percentage and flow rate, i.e., $$K = \frac{\Delta CH_4}{\Delta Q}$$

$$\Delta CH_4 = CH_4T1 - CH_4T0$$

$$\Delta Q = QT1 - QT0$$

The factor $S_t$ indicates the degree of stability of the well, i.e., how as the flow rate varies, the oxygen concentration varies.

$$St = \frac{\Delta O_2}{\Delta Q}$$

A well with a high factor $S_t$ indicates that there are high changes in oxygen concentration at small increases in flow rate, denoting some instability in the well. Whereby, at the management level, it is more convenient to extract that flow of biogas from another, more stable neighboring well.

The factor K and the factor $S_t$ contribute to compiling an index Z of the "performance" of the wells.

The performance criterion is calculated from the factor K, from which an equalization percentage is subtracted based on the value of the factor $S_t$. The size of the equalizing incidence of the factor $S_t$ will be defined at a later step.

The following logic is applied for wells PEa with a performance index above the average value (positive performance): every ten seconds, the adjustment valve V is opened by 1% (or lower value depending on the resolution of actuator A) until the difference between negative pressure 40 at T0 and the currently measured negative pressure 40 ($\Delta P$) is equal to 1 mbar, i.e., $\Delta P=PT0-Patt=1$ mbar. Also in this case, such an operation is feasible if adjustment valve V is not fully open.

The following logic is applied for wells PEa with a performance index below the average value (negative performance): every ten seconds, the adjustment valve V is opened by 1% (or lower value depending on the resolution of the actuator until the difference between negative pressure 30 at TO and the currently measured negative pressure 30 ($\Delta P$) is equal to $-1$ mbar, i.e., $\Delta P=PT0-Patt=-1$. Of course, such an operation is feasible if adjustment valve V is not fully closed.

The continuous cycle performance is calculated again after thirty minutes.

Although the wells PE1, PE2, PE3 . . . , PEN are operated individually, the collection area (the landfill D) is communicating, whereby it is easily conceivable that the opening/closing action of a well PEi will also impact neighboring wells PEi−1, PEi+1, etc.

In this case, there is an overlap of the well extraction influence ranges.

Figure 7:
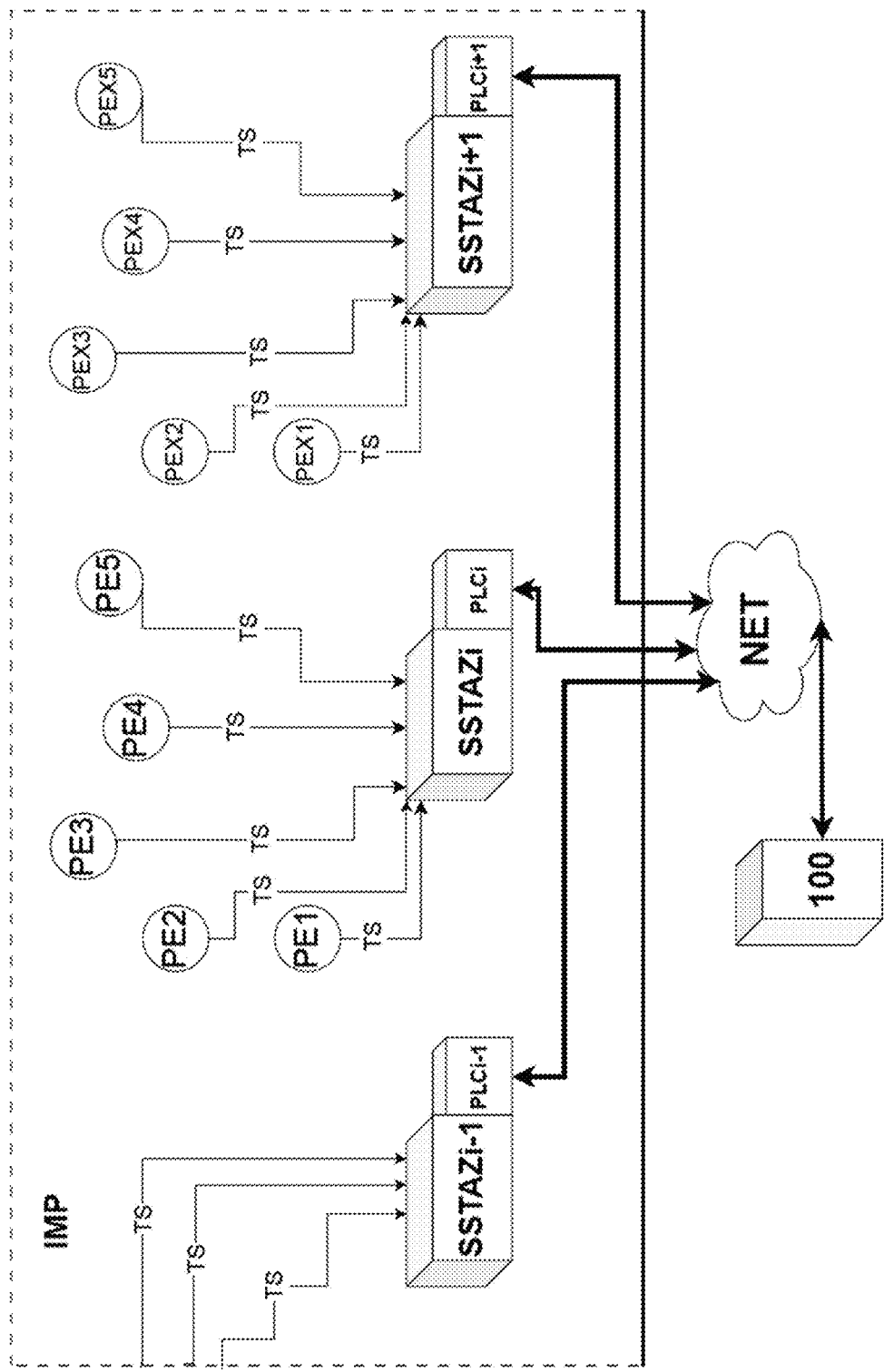
FIG. 7 shows an example of a plant with various substations and a remote control system.
Figure 8:
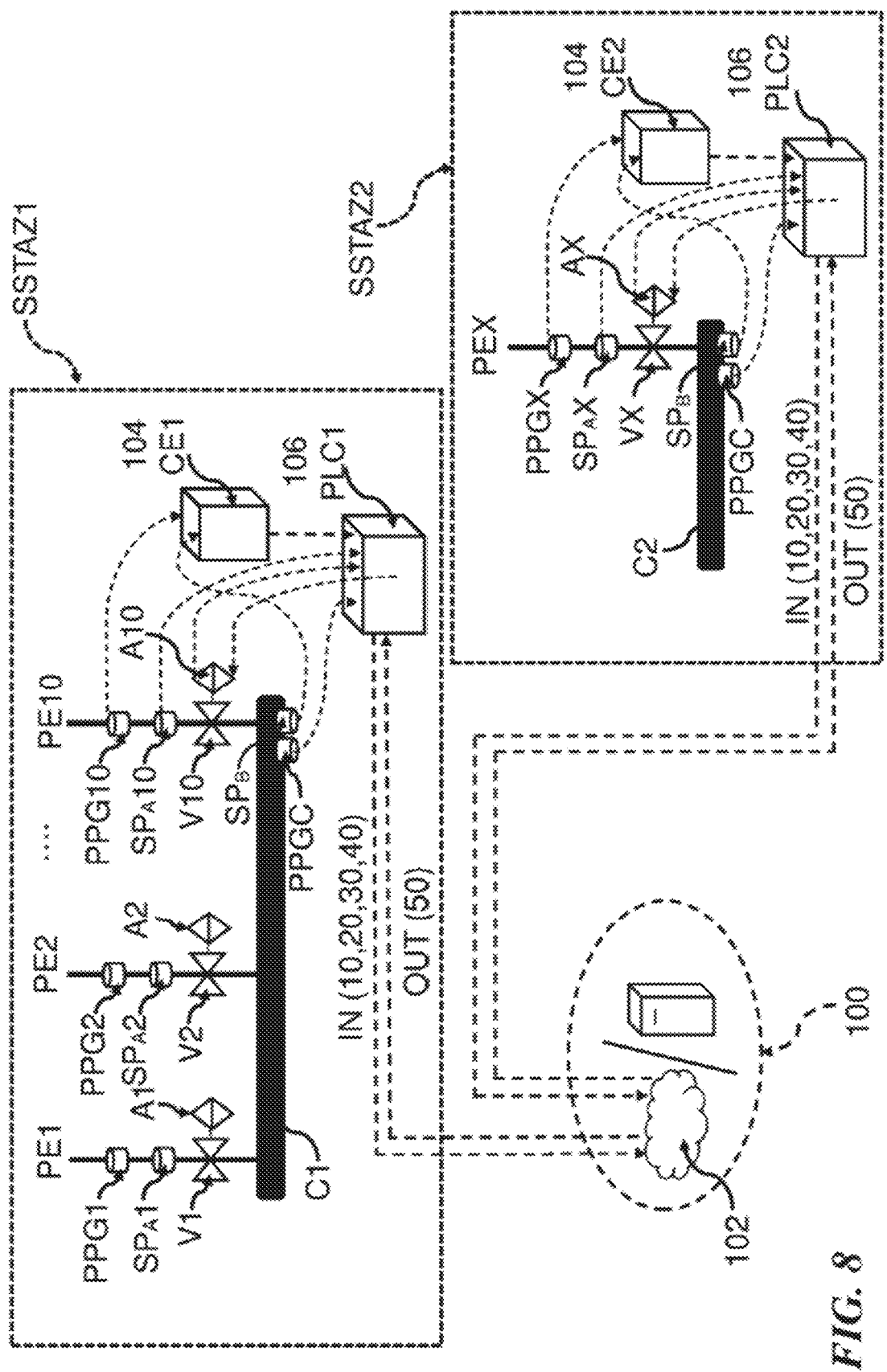
FIG. 8 shows an example of a plant with communication management on multiple substations.
Figure 9:
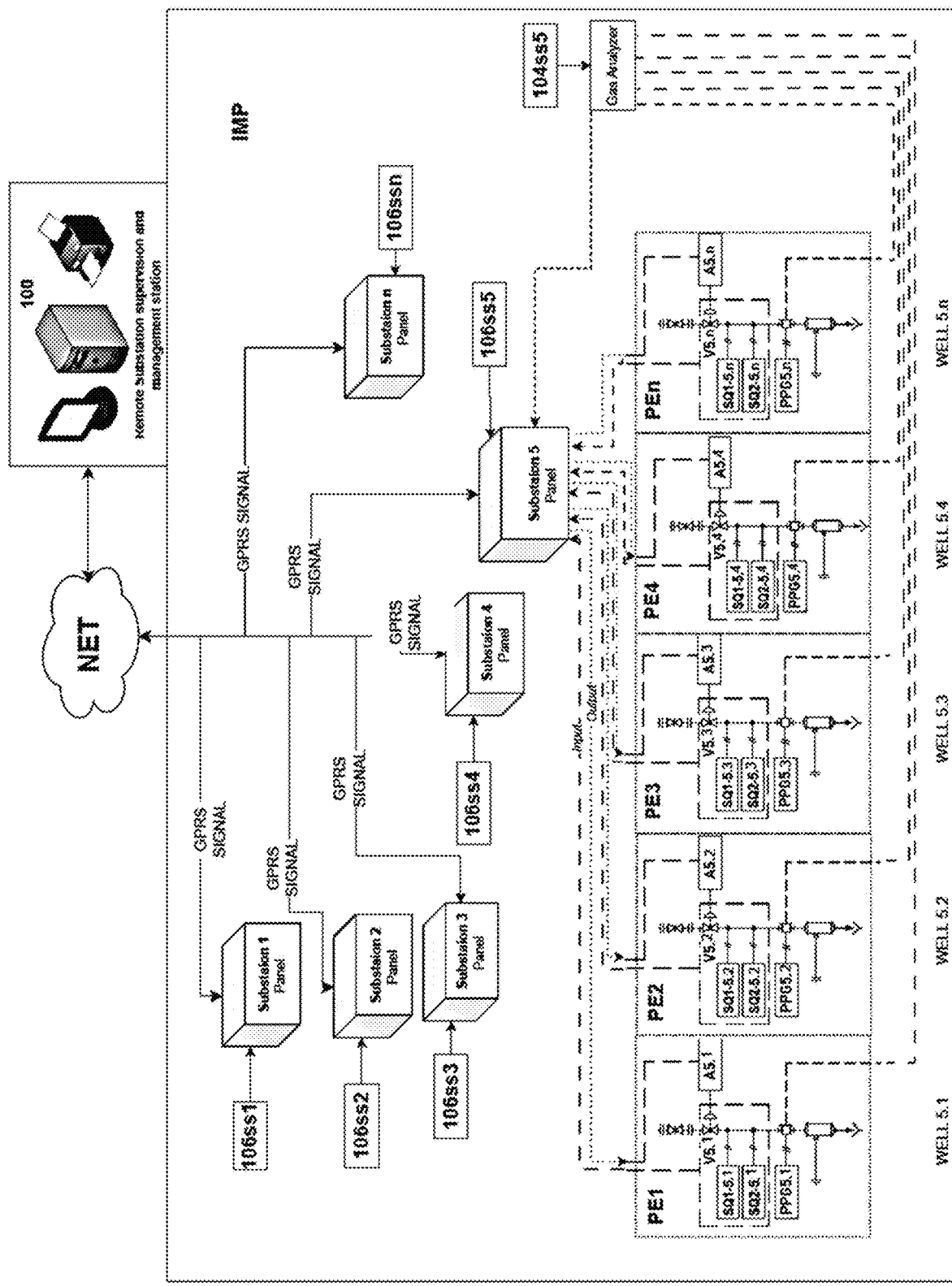
FIG. 9 shows an enlargement of a portion of the plant related to a substation.
Figure 10:
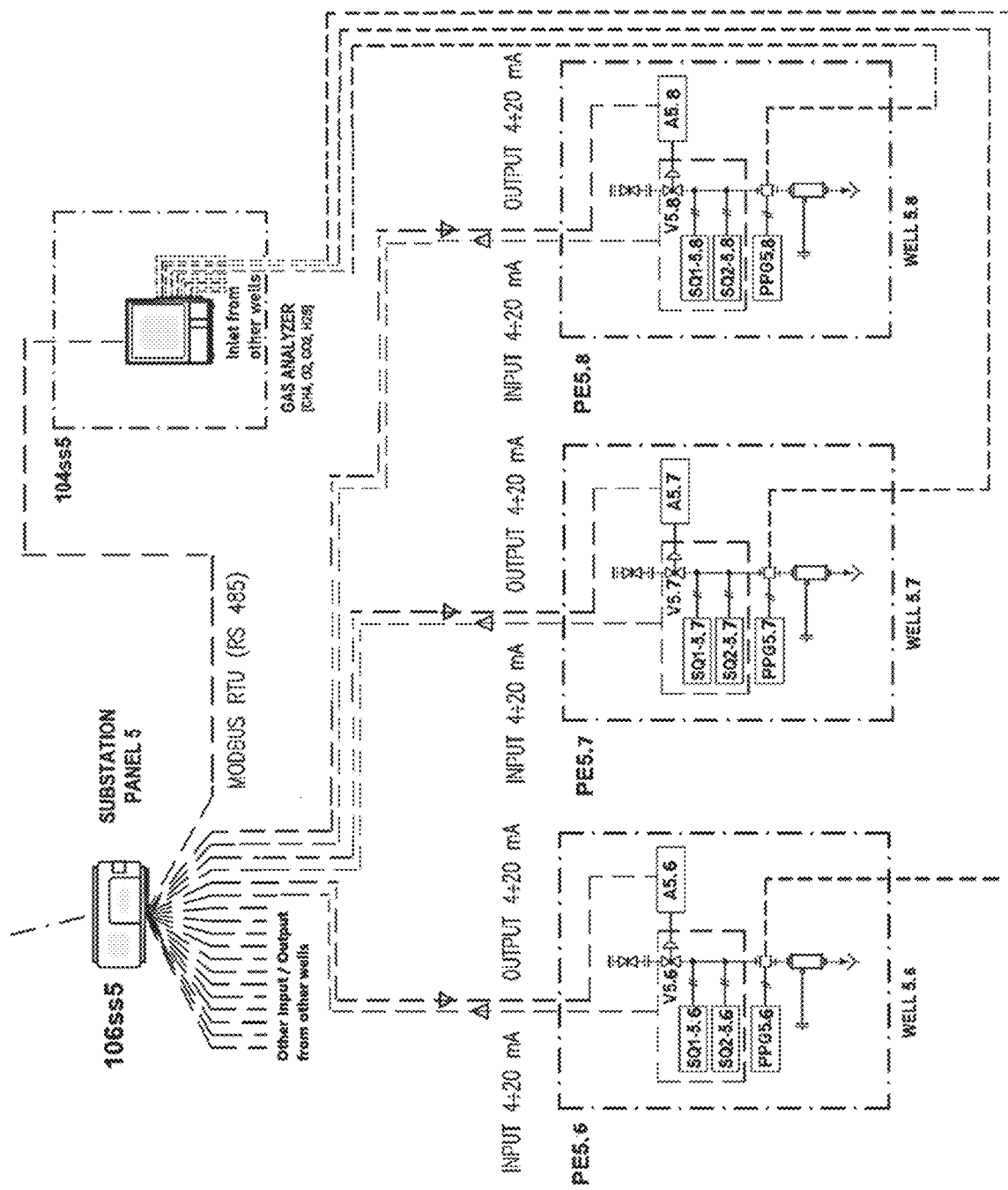
FIG. 10 shows an enlargement of a portion of the substation.
Figure 11:
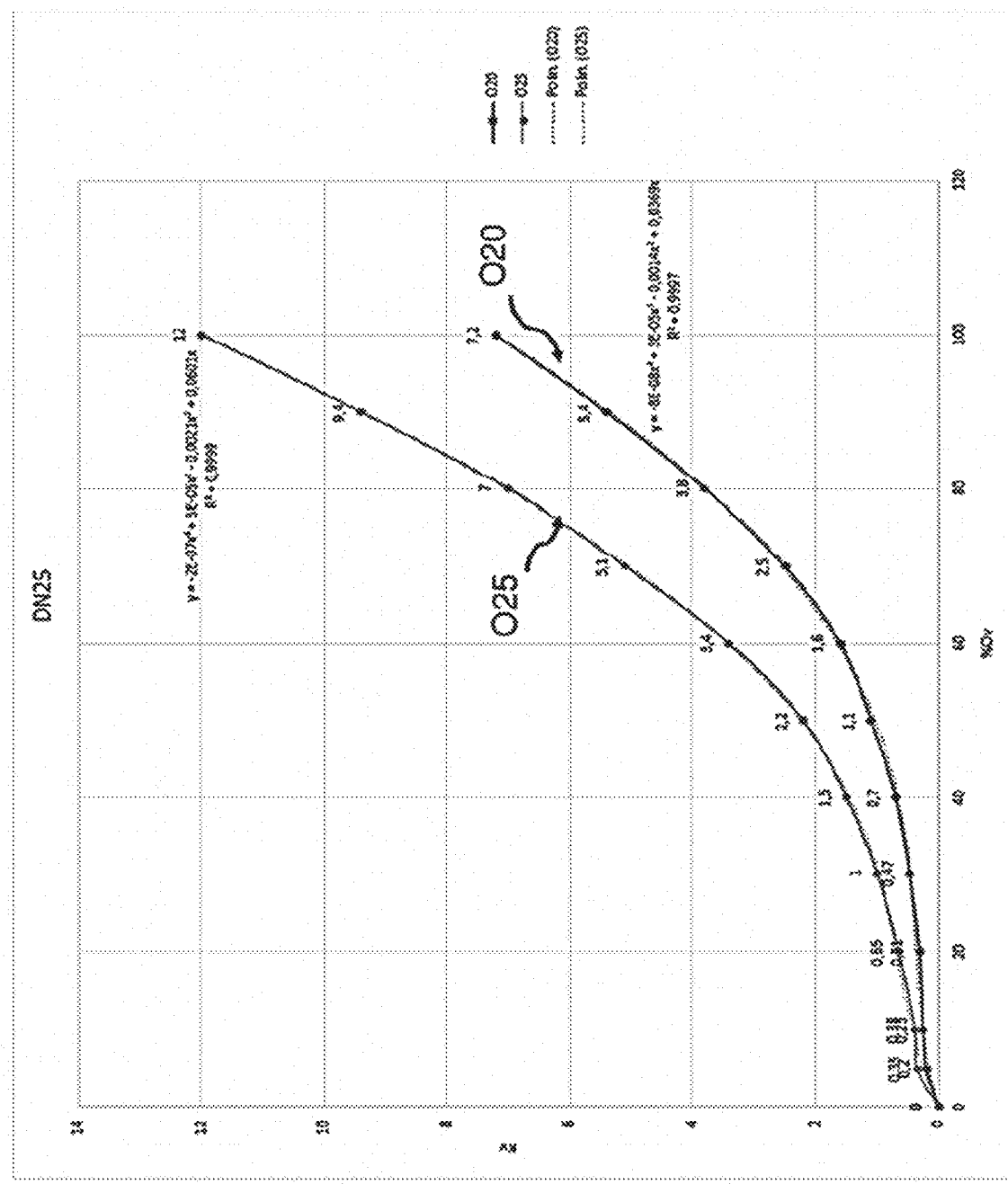
FIG. 11 shows the graph of the Kv of a DN25 valve as a function of the percentage of valve opening, according to the orifice diameter.
Figure 12:
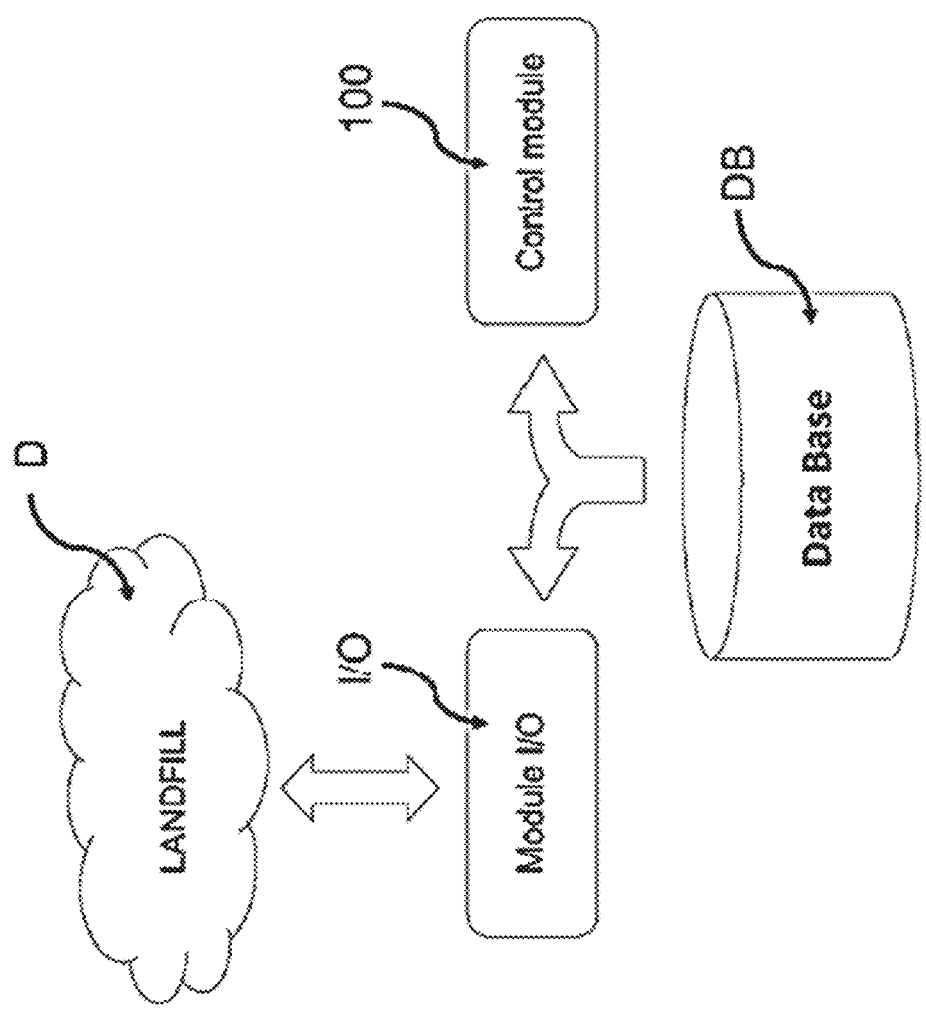
FIG. 12 is an example of system implementation.

Referring to FIGS. 7-9, the plant IMP comprises a plurality of substations SSTAZ1, SSTAZ2 . . . , SSTAZn connected through the network NET to the remote control system 100. Each individual substation SSTAZi has a control panel 106*ssi* and a biogas analyzer 104*ssi*.

The control panel 106*ssi* receives ten inputs, i.e., the values measured from the sensors S, SG, SQ, of each individual well PE. The measured values are the concentration 10 of methane $CH_4$, the concentration 20 of oxygen ($O_2$), the flow rate Q 30, and the negative pressure P 40 of the nine wells PEi1-PEi9, which are part of the substation SSTAZi and the overall values of the substation SSTAZi.

Each control panel 106*ssi* also has ten outputs with the controls for the actuators A of each well PE acting on the adjustment valves V.

The application of the algorithm described above results in an increase in flow from one well leading to a decrease in flow from the neighboring wells. When the majority of the flow is saturated, the system will respond by choking such a flow, resulting in more flow from neighboring wells.

Furthermore, such a well interference and communication principle will be used to have more flow conveyed from wells, which are deemed more stable, with lower factor Z. Therefore, an oscillatory behavior is assumed that, by its nature, never reaches absolute equilibrium, but tends toward optimization of overall performance.

The solution suggested here provides for the installation of a programmable logic controller PLC to connect with sensors S, SG, SQ, and actuators A in the field. The oxygen $O_2$ and methane $CH_4$ values are collected by an electronic controller CE connected to the controller PLC through Modbus serial protocol (RS485). The controller CE supports up to ten gas inputs. Therefore, nine PE1-PE9 extraction wells plus the manifold C at the outlet of the substation SSTAZ will be measured with each controller CE.

The controller PLC is responsible for making the connection of the various data collection systems, namely the sensors S, SP, SG, SQ, and the control of the actuators A.

The controller PLC makes information available to the remote control system 100, which will be installed on an application hosted on cloud server 102 (Window machine with a graphical interface). Such an application will be responsible for linking data from all managed substations SSTAZi and executing the expected optimization logic.

The hardware components to be installed in the field will now be described.

The solution involves installing a biogas analyzer 104 for each substation SSTAZ as shown in FIG. 9. The biogas analyzer 104 is a controller for use in harsh industrial environments. Such a biogas analyzer 104 is configured to sample ten measurement points, i.e., ten wells PE1-PE10, from plants under negative pressure.

The biogas analyzer 104 has a cooler with a pump to expel condensates. It is placed outside the Atex2 zone. The biogas analyzer 104 has four 4-20 mA analog outputs and a RS 485 (Modbus RTU) digital interface.

The sensors SQ of pressure SQ1 and flow rate SQ2 are installed for each well in the substation SSTAZ. Such sensors SQ are installed directly on pipe T of the suction well PE1-PE10. The output signal is a signal between 4-20 mA.

The actuators A are installed for each well in the substation SSTAZ, and in particular for each adjustment valve V. Such actuators A are installed directly on the pipe T of the well PE1-PE10 under suction. The flow rate range is 3-10 m3/h. The actuators A require a 24V power supply. The actuators A are selected from those suitable for Atex 2 environments. They have 4-20 mA analog control.

The electrical panel 106 must contain the circuitry for connection with the on-field probes. The safety barrier device for connecting the actuators in the Atex zone will be installed near the panel.

The requirements of controllers PLC are now described. Each controller PLC is provided with a CPU module, twenty analog inputs (4-20 mA/0/10 V) for flow and pressure measurements, and ten analog outputs for controlling the adjustment valves V (with 4-20 mA and 0-10V signals). Furthermore, there is a serial (Modbus) connection module with the controller to read the concentration 40 of oxygen $O_2$ and concentration 30 of methane $CH_4$. Furthermore, there is a sixteen-digital input module for digital connection of the controller, alarm line, emergency button, panel enable button, etc. similarly there is a sixteen-digital output module for connecting light and sound signaling devices. Finally, an Ethernet/GSM sending module is provided for connecting to the remote control system 100.

The suggested solution provides for the use of Siemens SIMATIC S7 PLC components.

Alternatively, a simple gateway for acquiring signals from the field can also be provided, provided with an API application interface to send data and receive commands with the software on the central server.

A SIEMENS communication system based on SIMATIC S7-1200 and a GPRS link channel through telephone network will be used for communication between the substation panel 106 and the remote control system software 100. The solution suggested here allows adjusting all the wells in the landfill simultaneously, taking into consideration the behavior of each well related to the others. In particular, each well is considered in combination with adjacent wells knowing that any change on one well affects the neighboring wells.

This implies that the adjustment set-up of each valve controlled by the central software is decided according to the parameters (composition, flow rate, negative pressure) corresponding to the respective well and also to the average parameters due from the analysis of all wells connected to the central system.

Therefore, the wells are not considered isolated and adjusted independently and there is a common logic to each substation and the whole system.

Indeed, once the valve of a well PEx has been adjusted, there will be a relative variation in the parameters of the well itself and also a change in the average parameters (methane, oxygen, K) of the whole system, which will consequently induce the system to command further adjustments either on the same valve or on the valves of other wells with quality characteristics (methane oxygen, K) worse than those of the new average values obtained, intending to increase at each pass the amount of methane IQ extracted from the landfill, and given by the product of the biogas flow rate and the relative methane concentration.

In the known art, the optimization takes place only at the level of the individual well, considering it in isolation, whereas the solution suggested here compares the results of all the monitored wells, optimizing the whole landfill and also comparing neighboring wells which influence each other.

In particular, the solution also takes into account the fact that if the valve of one well is opened more to extract more gas therefrom, then less will be extracted from the next one. The remote control system can tell from which well it is best to extract that amount of gas, and then it will go and open different wells differently.

Furthermore, in the prior art, the calculated parameters are used in a different manner. In particular, in the prior art each measurement is compared with those of a "typical" well, merely checking to stay within a predetermined range of values, especially in staying below certain oxygen values, as is normally done in manual well management logics.

Conversely, the solution described here allows comparing each measurement of each well with the previous one so as to understand whether the adjustment made was ameliorative or not, so as to be able to adapt the system to the most efficient configuration from time to time. In particular, there is a sort of management with feedback.

Therefore, the quality indicator IQ of a plant is calculated as:

$$IQ = \% \ CH_4 * Q$$

The flow rate turns out to be a key parameter, which can be measured directly, or be derived through load formulas.

The field parameters used for controls and settings for the proper operation of the plant IMP are now shown. Thus, furthermore to the previously mentioned parameters (negative pressure $p_A$, percentage $CH_4$, percentage $O_2$, flow rate Q), it results:
- the temperature of the biogas in the manifold (T) [measured in ° ° C.],
- the percentage of relative humidity of the biogas in the manifold (u) [%],
- the degree of purity or titration (X) [measured in g/m³],
- the negative pressure in the manifold ($p_B$) [measured in mbar],
- the negative pressure on the line (pc) [measured in mbar],
- the percentage of carbon dioxide ($CO_2$) [%],
- the percentage of nitrogen ($N_2$) [%],
- the hydrogen sulfide ($H_2S$) [measured in ppm],
- the percentage of water vapor ($vapH_2O$) [%],
- the percentage of remaining part of the compounds in the biogas mixture balance (Bal) [%],
- the percentage of external relative humidity ($u_{amb}$) [%],
- the external temperature ($T_{amb}$) [measured in ° C.],
- the external barometric pressure ($p_{amb}$) [measured in mbar],
- the rainfall intensity Ip [measured in mm], and
- the rainfall duration tp [measured in h].

The temperature T, humidity u, and titration X parameters are needed to determine the volume percentage of $vapH_2O$ vapor in the biogas mixture i.e., the grams of water that the biogas carries per cubic meter of flow rate, and the degree of saturation of the biogas to monitor the hydraulic tightness of the siphon head for condensate draining. If the relative humidity values are too low for a long time, an alert will be sent to the operator to check the filling of the condensate drain siphon of each well.

The rainfall intensity Ip, rainfall duration tp, outdoor relative humidity uamb, outdoor temperature Tamb, and outdoor barometric pressure pamb parameters are needed to determine the environmental conditions which can induce a profound change in conditions in the landfill D and determine the switch from one operating logic to another (e.g., the switch from an Optimization Cycle to an Exploratory Cycle explained in more detail later in the description).

The flow rate Qn (measured in $$\left[\frac{Nm^3}{h}\right])$$

of each pipe PEn (well/manifold) is calculated by analyzing the physical structure of the pipe (size/choke) and the composition of the fluid flowing through it.

The indication of sensors Sn, SQn, SGn allows determining the different percentage incidence of the measured elements.

The flow rate calculation function is as follows:

$$Q_n = 514 * K_v * \sqrt{\frac{\frac{\Delta p}{1000} * p_A}{\rho_n * (273 + T)} \cdot 1000}$$

where:
- $\Delta p$=is the difference in negative pressure between pA and pB,
- pA=is the negative pressure acting on the well,
- T=is the temperature (in ° C.) of the biogas in the manifold C,
- Kv=is the coefficient Kv of the V valve which defines the biogas flow (as a function of the opening percentage % $O_V$ of valve V),
- $\rho n$=is the density of the biogas.

At this point, it is necessary to detail the accessory formulas Kv and $\rho n$.

For the calculation of the manifold flow rate, there is pB instead of pA, Δp as the difference between pB and pC, and the Kv of the manifold valve C.

The coefficient Kv calculation must be differentiated according to the valve section used and the relative opening % $O_V$. Such a relationship is often provided by manufacturers through graphs, which can be discretized as in the formulas below:

1) DN25 valve and 20 mm orifice:

$$K_v = -8 * 10^{-8} x^4 + 3 * 10^{-5} x^3 - 0.0014 x^2 + 0.0369 x$$

2) DN25 valve and 25 mm orifice:

$$K_v = -2 * 10^{-7} x^4 + 5 * 10^{-5} x^3 - 0.0021 x^2 + 0.0601 x$$

In both cases, "x" represents the percentage of valve opening Ov (%).

The two expressions can be represented by the graph in FIG. 9, in which reference O20 indicates the curve of the first case with 20 mm orifice and reference O25 indicates the curve of the second case with 25 mm orifice.

The density ($\rho_N$), expressed in kg/m³ can be approximated (within the operating temperature range of the landfill) by the following function:

$$\rho = \frac{\begin{array}{c}(\% \text{ CH4} * \rho\text{CH4}) + (\% \text{ CO2} * \rho\text{CO2}) + \% \text{ O2} * \rho\text{O2}) + \\ (\% \text{ N2} * \rho\text{N2}) + (\% \text{ Bal} * \rho\text{Bal})\end{array}}{\% \text{ CH4} + \% \text{ CO2} + \% \text{ O2} + \% \text{ N2} + \% \text{ Bal}}$$

given by the product of the volume percentage of each constituent gas of the mixture times its density, all divided by the sum of the volume percentages of the constituents.

The system 100 provides for the installation of a data acquisition and data sending device (e.g., a PLC) to connect with probes or sensors S and the actuators A in the field. The values of $O_2$ and $CH_4$ are collected by an electronic controller CE connected to the acquisition device through Modbus serial protocol (RS485).

The controller CE for this type of application was chosen to support inputs of gas sampling points, i.e., nine PE extraction wells plus the manifold C at the outlet of the substation SSTAZ.

The controller CE can get up to twenty inputs, whereby up to nineteen extraction wells can be sampled, plus the value coming out of the manifold C of the substation SSTAZ.

The acquisition device PLC will be in charge of making the connection of the various data collection systems or sensors S and the control of actuators A. It will also have to make the information available with the remote control system 100, which will be installed on an application hosted on cloud 102 servers (e.g., Windows machine with a graphical user interface). Such an application 102 will be responsible for linking data from all managed substations SSTAZi and executing the expected optimization logic.

The field hardware components are now described.

The biogas analyzer 104 is a controller for use in harsh industrial environments. It is configured to sample ten measurement points, from negative pressure systems. The biogas analyzer 104 is provided with a cooler with a pump to expel condensates. The biogas analyzer 104 is set up outside the Atex2 zone. The controller 104 is provided with four 4-20 mA analog outputs and an RS 485 (Modbus RTU) digital interface.

The sensors S of pressure and flow rate SQ are sensors A installed directly on the pipe T of the well PE under suction. They output an analog output signal, such as 4-20 mA or alternatively 0-10V.

The actuators A are installed directly on the stub pipe T belonging to the extraction well PE. The flow rate range Q usually varies between 3-10 m³/h. The power supply is 24V. The sensors S are suitable for Atex 2 environments. They have 4-20 mA analog control.

The electrical panel 106 must contain the circuitry for connection with the on-field probes or sensors S. The safety barrier device for connecting the actuators A in the Atex zone will be installed near the panel 106.

The requirements of the acquisition device PLC will now be described. The device PLC comprises:
 a CPU module;
 twenty analog inputs (4-20 mA/0-10 V) for flow rate Q and pressure P measurements;
 ten analog outputs for controlling the valves V (4-20 mA/0-10 V);
 a serial connection module (Modbus) with the controller CE to read $O_2$ and $CH_4$;
 a sixteen digital input module for digital connection of CE controller, alarm line, emergency button, panel enable button, etc.;
 a sixteen digital output module for connecting light and sound signaling devices;
 an Ethernet/GSM sending module for connection with the remote control system.

A SIEMENS communication system based on SIMATIC S7-1200, and a GPRS link channel through a telephone network, will be used for communication between the panel 106 of the substation SSTAZ and the software.

The macrofunction algorithm of control system 100 is now described. The application context involves the use of remote services interconnected with the "field" system through Web Service/Rest Service type interfaces for retrieving probe or sensor S readings and controlling actuators A. The control system is expected to be a service with no user interaction. However, this interaction may be implemented if it is desired to switch to a manual configuration, e.g., such as for maintenance work, thus excluding automated management and control logics.

The application structure of the field access module must be decoupled from the control system to allow adaptation to the peculiarities of each plant.

The physical location of the control system is, therefore, not necessarily related to proximity to the plant, whereby cloud-type services and platforms can be used. Such an option provides access to the system and releases the customer from hardware maintenance issues, limited to the control/command system.

The system is implemented by three application components, operating/installed on a Windows/Linux "cloud" server, and the use of "Open Source" software tools is planned.

The database DB will be the container of the readings from the field taken and will contain the configuration and status information of the plant.

Three levels of information will be managed:
 Configurations: definition of structure and nomenclatures plant/substations/wells/probes;
 Readings/Commands: archive real-time readings and track the execution of commands given to the field;
 States: information on the current status of the facility and implementation of the control system;
 Events: application log.

The I/O module is in charge of performing the reading cycle of the sensor values S applied to the well PEs/manifold C located in the landfill D.

Each parameter will have a differentiated reading cycle:
 Pressure: 2 seconds;
 Temperature: 2 seconds;
 RH (humidity): 2 seconds;
 $CH_4$: 30 minutes;
 $O_2$: 30 minutes;
 $N_2$: 30 minutes;
 $H_2S$: 30 minutes.

The writing of actuators A (% valve opening $O_V$) will occur at the same time as the command is imparted by control module 100.

The control module 100 performs the adjustment of plant parameters. The operating cycle is based on the configurable timing of the application of the control algorithm. The activities triggered by the control module are entered into the database and executed by the I/O module.

The implementation of the control system 100 includes an initial step adapted to maximize the flow rate Q of the total flow generated by the plant IMP. The maximization must be within the limit of the cost-effectiveness of the suction with respect to the percentage of extracted methane % $CH_4$.

At the end of such a step, the control system 100 will activate the adjustment cycle for optimizing the flows of the wells PE.

The optimization aims to maximize methane extraction from the wells PEi with high efficiency while minimizing extraction from wells PEj with lower efficiency. Such an operation, cyclically repeated throughout the operation of the control system 100, tends to accommodate the different physical dynamics of the material of which the landfill D is composed and at the same time, directs the extraction to the areas that are most profitable during the period of operation.

The two steps will be referred to as the "Exploratory Cycle" and the "Optimization Cycle."

However, due to the dynamic nature of the landfill D, it is expected that the Exploratory Cycle will be carried out monthly to adjust the control system 100 to supervening physical and biological changes in the material in the landfill D, or if prolonged changes in external environmental conditions are recorded, such that the conditions within the landfill D may change, e.g., such as prolonged and intense rainfall events, drastic changes in external environmental conditions (pressure, temperature). All this information can be taken either from the weather stations in the plant or directly from online weather data from regional services.

Figure 13:
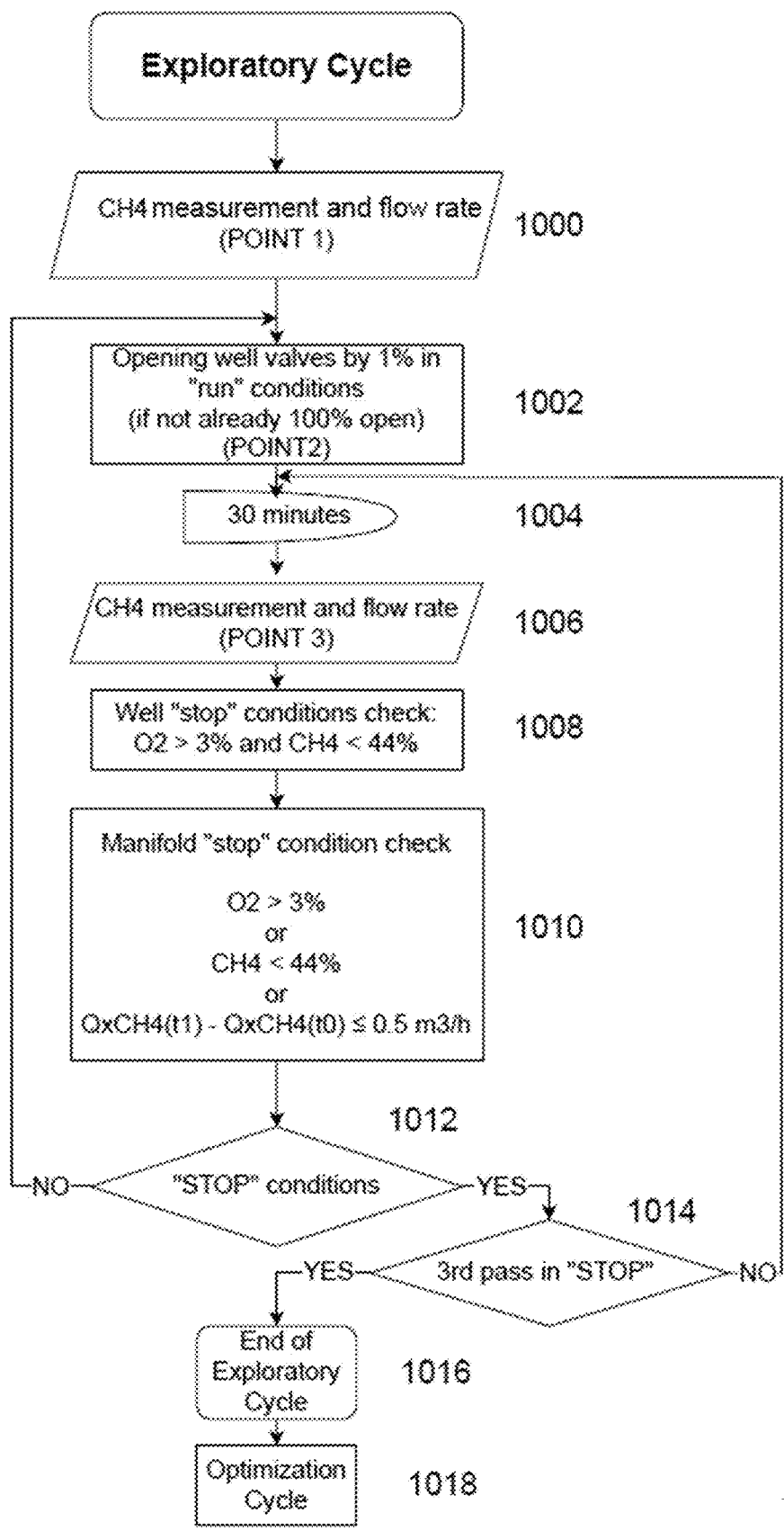
FIGS. 13 and 14 show flow charts related to operation during the Exploratory Cycle and the Optimization Cycle of the system.

The "Exploratory Cycle" (see FIG. 13) is performed at the start of the adjustment of a landfill D and, cyclically every thirty days. This causes the system 100 to identify the overall flow rate Qtot and adjust it to cyclical changes in landfill facilities. Such variations may also occur as a result of weather events, or to special maintenance needs, whereby it is expected that it will be possible to force such a cycle manually.

The percentage of methane % $CH_4$ and the flow rate Q are measured in step 1000. The 1% opening of the valves V of well PEs in operation (if they are not already 100% open) occurs in step 1002. The method waits for thirty minutes in a step of waiting 1004. The percentage of methane % $CH_4$ and the flow rate Q are measured in step 1006. The "stop" conditions of the well PE are controlled, i.e., if the percentage (20) of oxygen $O_2$ is more than 3% and the percentage (10) of methane % $CH_4$ is less than 44% in step 1008. In a step 1010, the "stop" conditions of the manifold C are checked, i.e., if the percentage 20 of oxygen $O_2$ is more than 3%, or the percentage 10 of methane % $CH_4$ is less than 44%, or if the variation of the quality indicator IQ at time t1 and at time t0 is less than or equal to 0.5, i.e., $QxCH_4(t1) - QxCH_4(t0) \leq 0.5$ m³/h. In decision-making step 1012, the method checks whether the stop conditions occur. If no, the method goes back to step 1002; if yes, in a decision-making step 1014, the method checks whether it is already the third pass in the "stop" conditions. If no, the method goes back to step 1006; if yes, the method goes to step 1016, in which the "Exploratory Cycle" ends, and in step 1018 the "Optimization Cycle" is recalled.

Specifically, there are the following commands:

1) At the start of the Exploratory Cycle (t0), the measurement of the values of the percentages of $O_2$, $CH_4$ and flow rate (Q) on the manifold C and individual well PEs.

2) All opening valves Px of the well Vx in operation or "run" are opened by 1% (if not already 100%). Initially, all well PEs are considered operational and thus in "run" status. During the cycle, as a result of the safety checks described below, some wells PEy may be placed in a "stop" state and excluded from the Exploratory Cycle logic.

The following safety checks are active during the Exploratory Cycle:

well PEi with $O_2 > 3\%$: if $CH_4 \geq 44\%$ well PEi in normal operation, if $CH_4 < 44\%$ well PEi in "stop" conditions (is excluded from periodic openings);

well PEj with $O_2 > 4\%$: well PEj is put in "stop" state (it is excluded from periodic openings), and if $CH_4 \geq 44\%$ an "ALERT" is generated.

3) The $O_2$, $CH_4$ and flow rate in the manifold C are measured again 30 minutes after opening ($t_1$).

4) The safety condition of each well is checked as described above.

5) A new 1% opening of the well valves is performed unless one of the following conditions occurs:
   a) % $O_2$ in the manifold $C \geq 3\%$;
   b) % $CH_4$ in the manifold $< 44\%$;
   c) Reduced methane gain: $QxCH_4(t_1) - QxCH_4(t_0) \leq 0.5$ m³/h (0.5 configurable parameter).

6) In the context of the openings of the wells PE, at each step $t_1$ that at least one well reaches 90% opening, a 1% opening of valve V of manifold C (if not already at maximum opening) is performed.
   a) If the manifold C reaches the maximum opening, the system makes a notification to the outside for the request to increase the speed of the suction pump.

7) After the conditions of step 5), the system will go into a "stop" state for thirty minutes and cycle again from step 3).
   a) On the third consecutive switch in which the "stop" conditions remain, the Exploratory Cycle ends and the control system switches to the Optimization Cycle.

8) If none of the conditions in step 5) occur, the cycle starts again from step 2).

During the Exploratory Cycle, the control of the valve Vc of the manifold C is managed exclusively by the automatic system. The manual control will be allowed in the next step of the Optimization Cycle.

The normal duty cycle of the control system is to maximize/optimize the methane concentration for the same overall suction flow rate, which is already maximized through the startup/Exploratory Cycle, by increasing the flows with higher efficiency and reducing those with lower efficiency.

The cycle is made based on calculating the value of the probes $CH_4$ and calculating the flow rate (Q) of individual wells and the manifold.

The formula for calculating the flow rate Q is as described above and given here:

$$Q_n = 514 * K_v * \sqrt{\frac{\frac{\Delta p}{1000} * p_A}{\frac{1000}{\rho_n * (273 + T)}}}$$

The Optimization Cycle involves a thirty-minute loop. Such a value may be revised based on contingent needs and/or the sensors used.

The variables used in this algorithm are as follows:

QX(t0): flow rate of the well "PEx" at the sampling instant t0

CH4X(t0): methane percentage of the well "PEx" at sampling instant t0

QC(t0): flow rate of manifold C at sampling instant t0

CH4C(t0): percentage of methane in the manifold C at sampling instant t0

QX(t1): flow rate of the well "PEx" at the next sampling instant t1

CH4x($t_1$): methane percentage of the well "PEx" at the next sampling instant $t_1$ $Q_C(t_1)$: flow rate in manifold C at the next sampling instant $t_1$ CH4$_C(t_1)$: percentage of methane in manifold C at the next sampling instant $t_1$ When the cycle starts, the values $t_1$ are loaded (the values "$t_0$" are initially set to 0).

During the first cycle (first sampling) the current "$t_1$" values are loaded.

At the end of each cycle, the values "$t_1$" become "$t_0$" and the $t_1$ are assigned the new current values.

The well performance indicator (factor K) is defined as follows:

$$K = \frac{\Delta Q_{CH4}}{\Delta Q} = \frac{(Q_1 * CH4_1) - (Q_0 * CH4_0)}{Q_1 - Q_0}$$

This is the main indicator and indicates the contribution in terms of methane within the flow rate increase $\Delta Q$.

In addition to the performance index, the extent to which the dynamic behavior of the individual well PEn is instrumental in achieving optimal production must be taken into account.

Many factors can affect the operating dynamics of each well PE and, overall, of the whole landfill D, such as the morphology of the terrain, the flow of rainwater within the landfill, different materials that may have been deposited, different solar exposure, the integrity of the coverings and above and/or below, etc.

These factors may affect the responsiveness and/or promptness to "react" to external impulses, such as the adjustments handled by the present control system may be, and one possible consequence is that some wells may have oscillatory behavior, considering the chosen loop period.

A parameter "St" (on a 0-100 scale) is defined for each well to qualify its "stability." Based on the ratio $$St = \frac{\Delta O_2}{\Delta Q}$$

St=0 indicates maximum stability,
St=100 indicates maximum instability.

The parameter St, initially configured to homogeneous values for all wells, can vary based on the dynamic behavior of the landfill and will be continuously re-calibrated as the data available to the system increases, which provides a better understanding of the behavior of the well PE.

The use of the parameter St contributes to calculating the factor "Z", the performance index of the well:

$$Z_x = K_x + \frac{St * (K_C - K_x)}{100}$$

Where the factor Kc is the index of average concentration of methane within the biogas extracted from the whole landfill.

Where the value $Z_x$ deviates from $K_c$ by a given value, the following operation is performed:

if $Z_x > K_c$, i.e., the concentration of methane present in the flow increment $\Delta Q$ is greater than the value of $K_c$, the valve of the well PEx is opened until a negative pressure of 1 mbar is reached from the measurement at instant $t_1$ if $Z_x < K_c$, i.e., the concentration of methane present in the flow rate increase $\Delta Q$ is lower than the value $K_c$, the well valve PEy is closed until a negative pressure of 1 mbar is reached from the measurement at instant $t_1$.

Such an opening-closing mechanism is done by opening/closing the respective valve Vx or Vy by 0.5% and taking the pressure/negative pressure measurement after ten seconds.

Some safety checks are performed on individual wells before calculating the performance.

Well value $H_2$St verification: if the value is higher than a parameter PAR to be defined, the well will be operated in closing mode (similarly to the case $Z_x < K_c$)

"Reverse" well check: if the negative pressure/pressure generated as a result of 0.5% valve opening/closing is more than 3 mbar, the control system performs the opposite operation (+/−1 mbar from the value $t_0$)

Well $O_2$ value check: if the probe $O_2$ value exceeds 3%, the check system will carry out closing until +1 mbar is reached from to. On the third loop with the threshold exceeded, an external ALERT will be generated.

Figure 14:
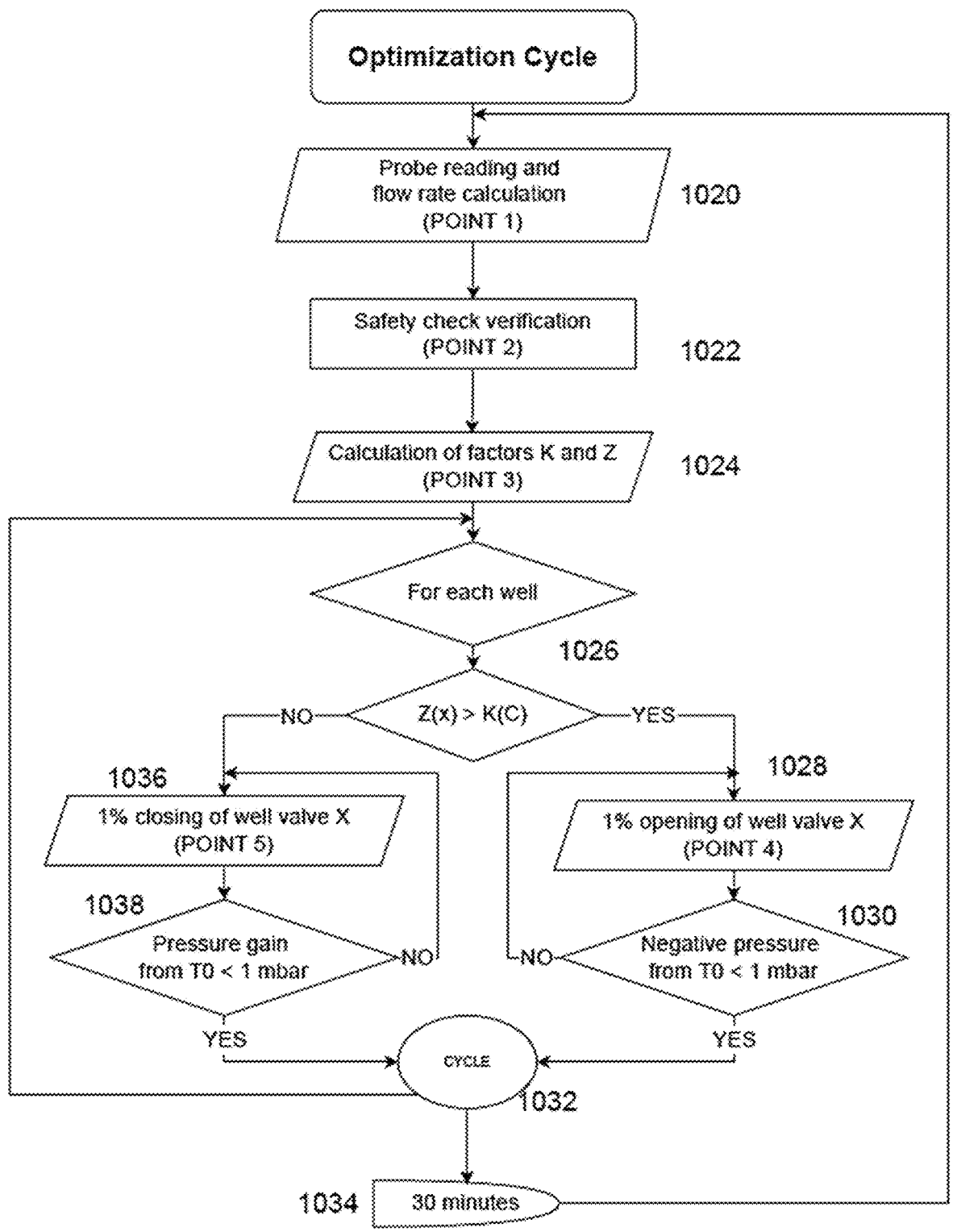

FIG. 14 shows the "Optimization Cycle."

The measurements performed by the probes or sensors S and calculating the flow rate Q are read in step 1020. Safety controls are checked in step 1022. The factors K and Z are calculated in step 1024. The method checks whether the factor Z(x) is greater than the factor K(x) in a decision-making step 1026 for each well PEx.

If yes, the valve Vx of the well PEx is opened by 1% in step 1028, and the method checks in a decision-making step 1030 whether the negative pressure from t0 is less than 1 mbar. If no, the method goes to step 1028; if yes, the method goes to step 1032.

If no, the valve (Vx) of the well (PEx) is closed by 1% in step 1036 and the method checks whether the pressure gain from to is less than 1 mbar in a decision-making step 1038. If no, the method goes to step 1028; if yes, the method goes to step 1032.

In step 1032, the cycle is restarted and the method goes back to step 1026. Then in a step of waiting 1034, the method waits for thirty minutes and then goes back to the initial step 1020.

Specifically, there are the following commands:

1) At the beginning of the Optimization Cycle ($t_1$), the pressure SP, $CH_4$, $O_2$, $H_2$St, temperature and flow rate value (Q) calculation probes on individual well PEs and manifold C are read. At this step, the measurements/calculations performed at the previous cycle are considered ($t_0$) (null values at the first run).

2) Safety checks are verified and actions (if necessary) described in the previous paragraph are performed (if necessary). The wells concerned by such actions are not involved in the operations described in the following points.

3) The factor Z of each well PE is determined.

4) For wells with $Z_X > K_C$ (greater than a parametric factor)
   a) pressure $p_1$ (pressure in mbar at instant $t_1$) is stored
   b) the valve of well X is opened by 0.5%
   c) the method waits for ten seconds
   d) the achieved pressure is stored, and if the difference with $p_0$ is less than 1 mbar, the method goes back to "4.b".

5) For wells with $Z_X < K_C$ (smaller by a parametric factor)
   a) pressure $p_1$ (pressure in mbar at instant $t_1$) is stored
   b) the valve of well X is closed by 0.5% c) the method waits for 10 seconds d) the achieved pressure is stored, and if the difference with $p_0$ is less than 1 mbar, the method goes back to "4.b".

6) The method starts for thirty minutes and starts again from step 1).

Obviously, without prejudice to the principle of the invention, the construction details and the embodiments can widely vary with respect to the above-disclosed description given by way of non-limiting example, without however departing from the scope of the present invention.

The invention claimed is:

1. A remote control system for managing a landfill biogas collection plant comprising a plurality of extraction wells organized in substations, wherein said remote control system is configured to automate the monitoring and adjustment of the extraction of biogas from the landfill so as to increase the production and maximize the quantity of methane extracted, said remote control system comprising:

a central server system, an infrastructure of controllers for data acquisition and data sending connected to each of said substations, an infrastructure of sensors associated with each of said plurality of extraction wells, adjustment valves for each of said plurality of extraction wells, and actuators of said adjustment valves, wherein said infrastructure of sensors are configured to measure values, including the volume percentage of methane % CH4, the volume percentage of oxygen % O2, the sucked flow rate Q, and the applied negative pressure P in said plurality of extraction wells, and are coupled to said infrastructure of controllers for data acquisition and data sending, wherein said infrastructure of controllers are configured to receive said values measured by the infrastructure of sensors and send said values to the central server system, and wherein said central server system is configured to execute software to process and compare values measured by the infrastructure of sensors and generate actuation commands for the actuators acting on the adjustment valves, wherein said software is configured to implement:

a preference principle algorithm that calculates a quality indicator of the extraction wells as the product of the percentage of methane CH4 and the flow rate of the extraction well, i.e. $IQi=\% \, CH_{4i} \times Qi$, compares the quality indicators of the extraction wells and generates actuation commands that direct the actuators to open the valves of extraction wells with a higher quality indicator compared to the other extraction wells, and an interference principle algorithm that, in case of interfering extraction wells, calculates an average quality indicator of said interfering extraction wells, compares the quality indicators of each interfering extraction wells to the average quality indicator of said interfering extraction wells, and generates actuation commands that direct the actuators to suck more biogas from the extraction wells that have a quality indicator higher than the average quality indicator of said interfering extraction wells.

2. The remote control system according to claim 1, wherein the central server system is further configured to (i) receive input data from each controller of each substation at regular and predetermined intervals, (ii) execute said software, (iii) generate additional actuation commands, and (iv) send said actuation commands for the actuators acting on the adjustment valves to each controller of each substation in the form of indications for the actuators to adjust said adjustment valves of individual extraction wells.

3. The remote control system according to claim 1, wherein said central server system is configured to generate actuation commands to suck biogas from a hole in the landfill through an extraction pipe of an extraction well inserted in said hole, and wherein said central server system is configured to generate actuation commands to open/close said adjustment valves in order to convey the biogas extracted through a group of extraction pipes to a substation collecting pipe through stub pipes, connected to the extraction pipes in proximity of an extraction well head.

4. The remote control system according to claim 3, wherein said infrastructure of sensors is configured to be positioned along said stub pipes and comprises at least one pressure measuring device.

5. The remote control system according to claim 3, wherein said central server system is configured to generate actuation commands to open/close valves connecting the substation collecting pipes to a collection line in order to convey the biogas extracted from each substation into said collection line.

6. The remote control system according to claim 1, wherein said central server system is further configured to execute software to calculate a well efficiency factor Kx of the extraction wells as the ratio between the variation in methane concentration and the variation in gas flow rate, $$Kx = \frac{\Delta CH_4}{\Delta Q},$$

compares the well efficiency factors of the extraction wells and generates actuation commands that direct the actuators to open the valves of extraction wells with a higher efficiency factor compared to the other extraction wells.

7. The remote control system according to claim 6, wherein said central server system is further configured to execute software to calculate a stability factor $S_t$, as the ratio between the variation in oxygen concentration and the variation in gas flow rate $$St = \frac{\Delta O_2}{\Delta Q},$$

in order to identify possible volubility conditions of said extraction wells.

8. The remote control system according to claim 7, wherein said central server system is further configured to execute software to calculate a performance factor Z of an extraction well as $$Z_x = K_x + \frac{St*(K_C - K_x)}{100},$$

where the factor Kc is an index of average concentration of methane within the biogas extracted from the entire landfill, compares the performance factors of the extraction wells to the factor Kc and generates actuation commands to (i) open the adjustment valves of extraction wells with a performance factor $Z_x > K_c$ and (ii) close the adjustment valves of extraction wells with a performance factor $Z_x < K_c$.

9. The remote control system according to claim 1, wherein the central server system is further configured to generate actuation commands for gradually closing an extraction well if the measured concentration of oxygen $O_2$ is more than 2%.

10. The remote control system according to claim 1, wherein the central server system is further configured to generate actuation commands for closing and opening the adjustment valve of an extraction well with an incidence of 1.5 mbar every thirty minutes.

11. The remote control system of a plant according to claim 1, wherein the central server system is further configured to process the values measured by the infrastructure of sensors to identify the extraction wells with a percentage of methane % $CH_4 > 45\%$.

12. The remote control system according to claim 1, wherein said infrastructure of controllers are provided with microprocessors configured to send to the central server system values of an individual substation measured by the infrastructure of sensors and receive back from the central server system actuation commands and adjustment commands for the actuators of the adjustment valve of an individual substation.

13. A remote management and control method for managing a landfill biogas collection plant, comprising a plurality of extraction wells organized in substations, wherein said method comprises an Exploratory Cycle and an Optimization Cycle, wherein the Exploratory Cycle is performed when the plant is started and monthly therefrom to adapt the plant to the physical and biological mutations of the landfill, or when prolonged changes in external environmental conditions affecting the conditions inside the landfill are recorded, wherein said Exploratory Cycle comprises the following steps:
for each extraction well of a plurality of extraction wells:
measuring a percentage of methane % $CH_4$ and the flow rate Q,
opening the valves of the extraction wells in operation by 1%,
waiting for thirty minutes,
measuring the percentage of methane % $CH_4$ and the flow rate Q,
checking the "stop" conditions of the extraction well, wherein the "stop" condition of the extraction well comprises a measured percentage of oxygen $O_2$ more than 3% and a measured percentage of methane % $CH_4$ less than 44%,
checking the "stop" conditions of a substation, i.e., wherein the stop condition of the substation comprises a measured percentage of oxygen $O_2$ more than 3%, or a measured percentage of methane % $CH_4$ less than 44%, or a variation of the quality indicator IQ at a time t1 and at a time t0 either less than or equal to 0.5, where the quality indicator IQ is the product of the percentage of methane $CH_4$ and the flow rate of an extraction well, i.e. $IQi = \% CH_{4i} \times Qi$,
checking whether the "stop" conditions of the extraction well and the "stop" conditions of the substation are verified; if not, the method comprises going back to the step of opening the valves of the extraction wells in operation by 1%; if yes, checking whether it is already the third pass in the "stop" conditions of the extraction well and the "stop" conditions of the substation and, if not, going back to the step of measuring the percentage of methane % CH4 and the flow rate Q; if yes, ending the "Exploratory Cycle" and starting the "Optimization Cycle";

wherein the "Optimization Cycle" comprises the following steps for each of the extraction wells:
reading measurements made by probes or sensors and calculating the flow rate,
checking that the "stop" conditions of the extraction well and the "stop" conditions of the substation are not met,
calculating a well efficiency factors Kx as $$Kx = \frac{\Delta CH_4}{\Delta Q},$$

a well stability factor St as $$St = \frac{\Delta O_2}{\Delta Q}$$

and a performance factor as $$Z_x = K_x + \frac{St * (K_C - K_x)}{100},$$

where the factor Kc is an index of average concentration of methane within the biogas extracted from the entire landfill,
checking whether the performance factor Zx is greater than the well efficiency factor Kx,
if yes, opening the valve of the extraction well by 1% and checking whether the variation in negative pressure a time t0 is less than 1 mbar:
if not, going back to the step of opening the valve of the extraction well by 1%,
if yes, restarting the "Optimization Cycle" and going back to the step of reading the measurements made by probes or sensors and calculating the flow rate,
if not, closing the valve of the extraction well by 1% and checking whether the pressure gain from a time t0 is less than 1 mbar:
if not, going back to the step of closing the valve of the extraction well by 1%,
if yes, restarting the cycle and going back to the step of reading the measurements made by probes or sensors and calculating the flow rate,
waiting for thirty minutes and then going back to the step of reading the measurements made by probes or sensors and calculating the flow rate.

14. The remote management and control method according to claim 13, further comprising, for at least one of the extraction wells, performing the following checks and related steps:
if $Z_x > K_c$ opening the extraction well valve until a decrease in negative pressure of 1 mbar is reached from a measurement at time $t_1$,
if $Z_x < K_c$ closing the extraction well valve until an increase in negative pressure of 1 mbar is reached from the measurement at time $t_1$.

15. A method for remotely managing and controlling a landfill biogas collection plant comprising a plurality of extraction wells organized in substations, the method comprising:

measuring, by an infrastructure of sensors associated with said plurality of extraction wells, values, including the volume percentage of methane (% $CH_4$), the volume percentage of oxygen (% $O_2$), the sucked flow rate (Q), and the applied negative pressure (P) at said extraction wells;

transmitting said values measured by the infrastructure of sensors to a central server system via an infrastructure of controllers for data acquisition and data sending;

processing said values at a central server system using software that:

calculates a quality indicator of the extraction wells as the product of the percentage of methane $CH_4$ and the flow rate of the extraction well, i.e. $IQi = \% CH_{4i} \times Qi$, compares the quality indicators of the extraction wells and generates actuation commands that direct actuators of adjustment valves located on the extraction wells to open the adjustment valves of extraction wells with a higher quality indicator compared to the other extraction wells;

in case of interfering extraction wells, calculates an average quality indicator of said interfering extraction wells, compares the quality indicators of each interfering extraction wells to the average quality indicator of said interfering extraction wells, and generates actuation commands that direct the actuators to suck more biogas from the extraction wells that have a quality indicator higher than the average quality indicator of said interfering extraction wells;

actuating the adjustment valves of the extraction wells according to the generated actuation commands to optimize biogas extraction by maximizing methane recovery.

16. The method according to claim 15, wherein said software further calculates a well efficiency factor $Kx$ of the extraction wells as the ratio between the variation in methane concentration and the variation in gas flow rate, $$Kx = \frac{\Delta CH_4}{\Delta Q},$$

compares the well efficiency factors of the extraction wells and generates actuation commands that direct the actuators to open the valves of extraction wells with a higher efficiency compared to the other extraction wells.

17. The method according to claim 15, wherein said software further calculates a stability factor $S_t$, as the ratio between the variation in oxygen concentration and the variation in gas flow rate $$St = \frac{\Delta O_2}{\Delta Q},$$

in order to identify possible volubility conditions of said extraction wells.

18. The method according to claim 17, wherein said software further calculates a performance factor Z of an extraction well as $$Z_x = K_x + \frac{St * (K_C - K_x)}{100},$$

where the factor Kc is an index of average concentration of methane within the biogas extracted from the entire landfill, compares the performance factors of the extraction wells to the factor Kc and generates actuation commands to (i) open the adjustment valves of extraction wells with a performance factor $Z_x > K_c$ and (ii) close the adjustment valves of extraction wells with a performance factor $Z_x < K_c$.

19. The method according to claim 15, further comprising the step of gradually closing an extraction well if the measured concentration of oxygen $O_2$ is more than 2%.

20. The method according to claim 15, further comprising the step of closing and opening the adjustment valve of an extraction well with an incidence of 1.5 mbar every thirty minutes.

21. The method according to claim 15, further comprising the step of processing the values measured by the infrastructure of sensors to identify the extraction wells with a percentage of methane % $CH_4 > 45\%$.

\* \* \* \* \*